(12) United States Patent
Honea et al.

(10) Patent No.: US 9,366,872 B2
(45) Date of Patent: Jun. 14, 2016

(54) APPARATUS AND METHOD FOR FIBER-LASER OUTPUT-BEAM SHAPING FOR SPECTRAL BEAM COMBINATION

(71) Applicant: Lockheed Martin Corporation, Bethesda, MD (US)

(72) Inventors: Eric C. Honea, Seattle, WA (US); Yongdan Hu, Bothell, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 53 days.

(21) Appl. No.: 13/987,265

(22) Filed: Feb. 18, 2014

(65) Prior Publication Data

US 2015/0234195 A1    Aug. 20, 2015

(51) Int. Cl.
*G02B 27/10* (2006.01)
*G02B 27/09* (2006.01)
(Continued)

(52) U.S. Cl.
CPC ............ *G02B 27/0927* (2013.01); *G02B 5/001* (2013.01); *G02B 19/0023* (2013.01); *G02B 19/0047* (2013.01); *G02B 27/0905* (2013.01); *G02B 27/0944* (2013.01); *G02B 27/1086* (2013.01); *G02B 27/30* (2013.01); *H01S 3/005* (2013.01); *H01S 3/067* (2013.01); *H01S 3/2391* (2013.01)

(58) Field of Classification Search
CPC .............. G02B 27/0927; G02B 27/09; G02B 27/0905; G02B 27/0916; G02B 27/0922; G02B 27/30; G02B 27/10; G02B 27/1006; G02B 27/1086; G02B 27/0944; G02B 19/00; G02B 19/0047; G02B 19/0057
See application file for complete search history.

(56) References Cited

U.S. PATENT DOCUMENTS 3,728,117 A    4/1973  Heidenhain et al.
4,200,846 A    4/1980  Stark et al.
(Continued)

FOREIGN PATENT DOCUMENTS

EP    1458067 A1    9/2004
EP    1482609 A1    12/2004
(Continued)

OTHER PUBLICATIONS

Augst, S.J., et al., "Wavelength beam combining of ytterbium fiber lasers", "Opt. Lett.", 2003, pp. 331-333, vol. 28, No. 5.
(Continued)

*Primary Examiner* — Joseph P Martinez
(74) *Attorney, Agent, or Firm* — Charles A. Lemaire; Jonathan M. Rixen; Lemaire Patent Law Firm, P.L.L.C.

(57) ABSTRACT

A method and apparatus for combining a plurality of laser beamlets to form a single annular beam using spectral beam combination. This invention includes a plurality of laser sources that emit a plurality of beamlets, wherein each one of the plurality of beamlets has a different wavelength; a beam annularizer that includes a plurality of optical units arranged to receive the beamlets, and configured to convert each beamlet into a respective annular beam that has an annular cross-sectional power profile; a beam-intersection transform element configured to point each respective one of the plurality of annular beams in an angular intersection arrangement toward a first location; and a spectral beam combiner at the first location configured to combine the plurality of wavelengths in the plurality of annular beams into a first annular spectrally combined beam.

22 Claims, 15 Drawing Sheets

(51) Int. Cl.
  *G02B 19/00* (2006.01)
  *G02B 5/00* (2006.01)
  *G02B 27/30* (2006.01)
  *H01S 3/067* (2006.01)
  *H01S 3/23* (2006.01)
  *H01S 3/00* (2006.01)

(56) References Cited

U.S. PATENT DOCUMENTS

| | | | |
|---|---|---|---|
| 4,278,902 A | 7/1981 | Loy et al. |
| 4,313,648 A | 2/1982 | Yano et al. |
| 4,367,040 A | 1/1983 | Goto |
| 4,424,435 A | 1/1984 | Barnes, Jr. |
| 4,523,315 A | 6/1985 | Stone |
| 4,655,592 A * | 4/1987 | Allemand | G01N 21/94 |
| | | | 219/121.74 |
| 4,794,345 A | 12/1988 | Linford et al. |
| 4,813,762 A | 3/1989 | Leger et al. |
| 4,862,257 A | 8/1989 | Ulich |
| 4,895,790 A | 1/1990 | Swanson et al. |
| 5,052,780 A | 10/1991 | Klein |
| 5,243,448 A | 9/1993 | Banbury |
| 5,319,668 A | 6/1994 | Luecke |
| 5,323,404 A | 6/1994 | Grubb |
| 5,379,310 A | 1/1995 | Papen et al. |
| 5,440,416 A | 8/1995 | Cohen et al. |
| 5,454,004 A | 9/1995 | Leger et al. |
| 5,526,155 A | 6/1996 | Knox et al. |
| 5,608,826 A | 3/1997 | Boord et al. |
| 5,642,447 A | 6/1997 | Pan et al. |
| 5,661,835 A | 8/1997 | Kato et al. |
| 5,802,236 A | 9/1998 | DiGiovanni et al. |
| 5,815,518 A | 9/1998 | Reed et al. |
| 5,818,630 A | 10/1998 | Fermann et al. |
| 5,838,700 A | 11/1998 | Dianov et al. |
| 5,847,863 A | 12/1998 | Galvanauskas et al. |
| 5,867,305 A | 2/1999 | Waarts et al. |
| 5,907,436 A | 5/1999 | Perry et al. |
| 5,912,910 A | 6/1999 | Sanders et al. |
| 5,930,030 A | 7/1999 | Scifres |
| 5,974,060 A | 10/1999 | Byren et al. |
| 6,014,249 A | 1/2000 | Fermann et al. |
| 6,023,361 A | 2/2000 | Ford |
| 6,028,879 A | 2/2000 | Ershov |
| 6,031,952 A | 2/2000 | Lee |
| 6,053,640 A | 4/2000 | Miyokawa et al. |
| 6,061,170 A | 5/2000 | Rice et al. |
| 6,072,931 A | 6/2000 | Yoon et al. |
| 6,081,635 A | 6/2000 | Hehmann |
| 6,097,863 A | 8/2000 | Chowdhury |
| 6,163,552 A | 12/2000 | Engelberth et al. |
| 6,163,554 A | 12/2000 | Chang et al. |
| 6,181,465 B1 | 1/2001 | Grubb et al. |
| 6,192,062 B1 | 2/2001 | Sanchez-Rubio et al. |
| 6,208,679 B1 | 3/2001 | Sanchez-Rubio et al. |
| 6,212,310 B1 | 4/2001 | Waarts et al. |
| 6,226,077 B1 | 5/2001 | Dunne |
| 6,226,126 B1 * | 5/2001 | Conemac | G02B 27/143 |
| | | | 250/230 |
| 6,275,623 B1 | 8/2001 | Brophy et al. |
| 6,295,304 B1 | 9/2001 | Koch et al. |
| 6,301,271 B1 | 10/2001 | Sanders et al. |
| 6,310,899 B1 | 10/2001 | Jacobovitz-Veselka et al. |
| 6,327,292 B1 | 12/2001 | Sanchez-Rubio et al. |
| 6,330,523 B1 | 12/2001 | Kacyra et al. |
| 6,339,662 B1 | 1/2002 | Koteles et al. |
| 6,381,008 B1 | 4/2002 | Branagh et al. |
| 6,381,388 B1 | 4/2002 | Epworth et al. |
| 6,400,495 B1 | 6/2002 | Zayhowski |
| 6,407,855 B1 | 6/2002 | MacCormack et al. |
| 6,418,152 B1 | 7/2002 | Davis |
| 6,426,965 B1 | 7/2002 | Chang et al. |
| 6,434,172 B1 | 8/2002 | DiGiovanni et al. |
| 6,456,756 B1 | 9/2002 | Mead |
| 6,496,301 B1 | 12/2002 | Koplow et al. |
| 6,501,782 B1 | 12/2002 | Farmer |
| 6,584,133 B1 | 6/2003 | Walker et al. |
| 6,603,912 B2 | 8/2003 | Birks et al. |
| 6,625,180 B2 | 9/2003 | Bufetov et al. |
| 6,625,364 B2 | 9/2003 | Johnson et al. |
| 6,631,234 B1 | 10/2003 | Russell et al. |
| 6,654,522 B2 | 11/2003 | Chandalia et al. |
| 6,665,471 B1 | 12/2003 | Farmer et al. |
| 6,696,142 B2 | 2/2004 | Baer et al. |
| 6,697,192 B1 | 2/2004 | Fan et al. |
| 6,717,655 B2 | 4/2004 | Cheng et al. |
| 6,754,006 B2 | 6/2004 | Barton et al. |
| 6,765,724 B1 | 7/2004 | Kramer |
| 6,775,057 B2 | 8/2004 | Akasaka et al. |
| 6,798,960 B2 | 9/2004 | Hamada |
| 6,807,338 B2 | 10/2004 | Bouteiller et al. |
| 6,819,871 B1 | 11/2004 | Baldwin et al. |
| 6,822,796 B2 | 11/2004 | Takada et al. |
| 6,829,421 B2 | 12/2004 | Forbes et al. |
| 6,830,813 B2 | 12/2004 | Ravi |
| 6,836,607 B2 | 12/2004 | Dejneka et al. |
| 6,845,108 B1 | 1/2005 | Liu et al. |
| 6,845,204 B1 | 1/2005 | Broeng et al. |
| 6,865,344 B1 | 3/2005 | Johnson et al. |
| 6,868,099 B1 | 3/2005 | Walker et al. |
| 6,882,431 B2 | 4/2005 | Teich et al. |
| 6,882,467 B1 | 4/2005 | Emori et al. |
| 6,882,468 B2 | 4/2005 | Emori et al. |
| 6,898,339 B2 | 5/2005 | Shah et al. |
| 6,901,197 B2 | 5/2005 | Hasegawa et al. |
| 6,914,916 B2 | 7/2005 | Pezeshki et al. |
| 6,917,466 B2 | 7/2005 | Namiki et al. |
| 6,917,631 B2 | 7/2005 | Richardson et al. |
| 6,937,795 B2 | 8/2005 | Squires et al. |
| 6,950,692 B2 | 9/2005 | Gelikonov et al. |
| 6,952,510 B1 | 10/2005 | Karlsen et al. |
| 6,958,859 B2 | 10/2005 | Hoose et al. |
| 6,959,021 B2 | 10/2005 | Po et al. |
| 6,959,130 B2 | 10/2005 | Fauver et al. |
| 6,960,027 B1 | 11/2005 | Krah et al. |
| 6,961,356 B2 | 11/2005 | Brown |
| 6,963,354 B1 | 11/2005 | Scheps |
| 6,965,469 B2 | 11/2005 | Avizonis et al. |
| 6,996,343 B2 | 2/2006 | Neilson |
| 7,043,127 B2 | 5/2006 | Hasegawa et al. |
| 7,050,221 B2 | 5/2006 | Emori et al. |
| 7,065,107 B2 | 6/2006 | Hamilton et al. |
| 7,072,369 B2 | 7/2006 | Matsushita et al. |
| 7,072,553 B2 | 7/2006 | Johnson et al. |
| 7,106,932 B2 | 9/2006 | Birks et al. |
| 7,113,327 B2 | 9/2006 | Gu et al. |
| 7,113,524 B2 | 9/2006 | Bonaccini et al. |
| 7,116,469 B2 | 10/2006 | Bragheri et al. |
| 7,128,943 B1 | 10/2006 | Djeu |
| 7,136,559 B2 | 11/2006 | Yusoff et al. |
| 7,142,757 B1 | 11/2006 | Ward |
| 7,167,300 B2 | 1/2007 | Fermann et al. |
| 7,190,705 B2 | 3/2007 | Fermann et al. |
| 7,199,919 B2 | 4/2007 | Emori et al. |
| 7,199,924 B1 | 4/2007 | Brown et al. |
| 7,206,123 B2 | 4/2007 | Emori et al. |
| 7,221,822 B2 | 5/2007 | Grudinin et al. |
| 7,227,814 B2 | 6/2007 | Frederick et al. |
| 7,233,442 B1 | 6/2007 | Brown et al. |
| 7,242,835 B2 | 7/2007 | Busse et al. |
| 7,248,399 B2 | 7/2007 | Taniguchi et al. |
| 7,259,906 B1 | 8/2007 | Islam |
| 7,280,730 B2 | 10/2007 | Dong et al. |
| 7,340,140 B1 | 3/2008 | Xu et al. |
| 7,349,589 B2 | 3/2008 | Temelkuran et al. |
| 7,349,611 B2 | 3/2008 | Broeng et al. |
| 7,362,497 B2 | 4/2008 | Hodder et al. |
| 7,375,877 B1 | 5/2008 | Di Teodoro et al. |
| 7,376,312 B2 | 5/2008 | Nawae et al. |
| 7,376,315 B2 | 5/2008 | Kurosawa et al. |
| 7,391,561 B2 | 6/2008 | Di Teodoro et al. |
| 7,400,442 B2 | 7/2008 | Matsushita et al. |
| 7,414,780 B2 | 8/2008 | Fermann et al. |

(56) References Cited

U.S. PATENT DOCUMENTS

| | | |
|---|---|---|
| 7,424,193 B2 | 9/2008 | Galvanauskas |
| 7,433,116 B1 | 10/2008 | Islam |
| 7,436,588 B2 | 10/2008 | Rothenberg et al. |
| 7,437,046 B2 | 10/2008 | DiGiovanni et al. |
| 7,440,167 B2 | 10/2008 | Taniguchi et al. |
| 7,446,315 B1 | 11/2008 | Tidwell |
| 7,447,444 B2 | 11/2008 | Igarashi et al. |
| 7,471,705 B2 | 12/2008 | Gerstenberger et al. |
| 7,477,666 B2 | 1/2009 | Liu |
| 7,501,330 B2 | 3/2009 | Ravi et al. |
| 7,508,853 B2 | 3/2009 | Harter et al. |
| 7,519,253 B2 | 4/2009 | Islam |
| 7,532,656 B2 | 5/2009 | Yang et al. |
| 7,548,368 B2 | 6/2009 | Akasaka et al. |
| 7,576,909 B2 | 8/2009 | Harter et al. |
| 7,590,323 B2 | 9/2009 | Broeng et al. |
| 7,620,077 B2 | 11/2009 | Henderson |
| 7,671,337 B1 | 3/2010 | Tidwell |
| 7,692,852 B2 | 4/2010 | Akasaka et al. |
| 7,701,987 B1 | 4/2010 | Savage-Leuchs et al. |
| 7,711,013 B2 | 5/2010 | Liu et al. |
| 7,768,700 B1 | 8/2010 | Savage-Leuchs |
| 7,782,912 B2 | 8/2010 | Harter et al. |
| 7,787,729 B2 | 8/2010 | Dong et al. |
| 7,835,608 B2 | 11/2010 | Minelly et al. |
| 7,846,767 B1 | 12/2010 | Sung |
| 7,872,794 B1 | 1/2011 | Minelly et al. |
| 7,876,498 B1 | 1/2011 | Honea et al. |
| 7,876,803 B1 | 1/2011 | Di Teodoro et al. |
| 8,094,689 B1 | 1/2012 | Koplow |
| 8,179,594 B1 | 5/2012 | Tidwell |
| 8,199,399 B1 | 6/2012 | Savage-Leuchs |
| 8,411,712 B2 | 4/2013 | Honea et al. |
| 8,441,718 B2 | 5/2013 | Mead |
| 8,472,763 B1 | 6/2013 | Liu et al. |
| 8,493,651 B1 | 7/2013 | Hu et al. |
| 8,503,840 B2 | 8/2013 | Hu et al. |
| 8,526,110 B1* | 9/2013 | Honea ............... H01S 3/06791 359/556 |
| 8,755,649 B2 | 6/2014 | Yilmaz et al. |
| 8,767,286 B2 | 7/2014 | Savage-Leuchs |
| 8,830,568 B2 | 9/2014 | Savage-Leuchs |
| 2002/0181856 A1 | 12/2002 | Sappey et al. |
| 2003/0016350 A1 | 1/2003 | Cheng et al. |
| 2003/0068150 A1 | 4/2003 | Ariel et al. |
| 2004/0033043 A1 | 2/2004 | Monro et al. |
| 2004/0076197 A1 | 4/2004 | Clarkson |
| 2004/0240038 A1 | 12/2004 | Kado et al. |
| 2005/0041702 A1 | 2/2005 | Fermann et al. |
| 2005/0169590 A1 | 8/2005 | Alkeskjold |
| 2006/0028374 A1 | 2/2006 | Fullerton |
| 2006/0067632 A1 | 3/2006 | Broeng et al. |
| 2006/0204190 A1 | 9/2006 | Ranka et al. |
| 2006/0233554 A1 | 10/2006 | Ramachandran et al. |
| 2007/0024959 A1* | 2/2007 | Peterson ............... G02B 5/04 359/362 |
| 2007/0229939 A1* | 10/2007 | Brown ............... G02B 27/1006 359/341.1 |
| 2008/0077200 A1 | 3/2008 | Bendett et al. |
| 2011/0122482 A1* | 5/2011 | Mead ............... F41H 13/0056 359/327 |

FOREIGN PATENT DOCUMENTS

| | | |
|---|---|---|
| WO | WO 0049436 | 8/2000 |
| WO | WO 0060388 | 10/2000 |
| WO | WO 0165647 | 9/2001 |
| WO | WO 2013062584 | 5/2013 |

OTHER PUBLICATIONS

Blaze Photonics (Crystal Fibre Company), "HC-580-01 'yellow'—Hollow Core Photonic Bandgap Fiber (product description)", "http://www.crystal-fibre.com/datasheets/HC-580-01.pdf", Feb. 10, 2006.

Blaze Photonics (Crystal Fibre Company), "HC-580-01 'yellow' Hollow Core Photonic Bandgap Fiber", "http://www.crystal-fibre.com/datasheets/HC-580-01.pdf", Feb. 10, 2006.

Blazephotonics (Company), "High NA Multimode Fiber MM-37-01 Product Description", "http://www.crystal-fibre.com/datasheets/MM-37-01.pdf", 2005.

Brooks, Christopher D, et al., "1-mJ energy, 1-MW peak-power, 10-W averagepower, spectrally narrow, diffraction-limited pulses from a photonic-crystal f", "Optics Express", Oct. 31, 2005, pp. 8999-9002, vol. 13, No. 22.

Champert, P.A., et al., "3.5 W frequency-doubled fiber-based laser source at 772 nm", "Applied Physics Letters", Apr. 23, 2001, pp. 2420-2421, vol. 78, No. 17.

Chen et al., "Laser-to-Fiber Coupling Scheme by Utilizing a Lensed Fiber Integrated with a Long-Period Fiber Grating", "IEEE Photonics Technology Letters", May 2000, pp. 501-503, vol. 12, No. 5.

Cooper, L.J., et al., "High-power Yb-doped multicore ribbon fiber laser", Nov. 1, 2005, pp. 2906-2908, vol. 30, No. 21.

Crystal Fibre (Company), "High-Power Fiber Laser and Amplifier Subassembly Modules Product Description", "http://www.crystal-fibre.com/products/subassemblies.shtm", 2005 (copyright).

Crystal Fibre (Company), "Multimode Ultra High NA Photonic Crystal Fiber MM-HNA-110 Product Description", "http://www.crystal-fibre.com/datasheets/MM-HNA-110.pdf", Apr. 2005.

Crystal Fibre (Company), "Multimode Ultra High NA Photonic Crystal Fiber MM-HNA-200 Product Description", "http://www.crystal-fibre.com/datasheets/MM-HNA-200.pdf", Apr. 2005.

Crystal Fibre (Company), "Multimode Ultra High NA Photonic Crystal Fiber MM-HNA-35 Product Description", "http://www.crystal-fibre.com/datasheets/MM-HNA-35.pdf", Apr. 2005.

Crystal Fibre (Company), "Multimode Ultra High NA Photonic Crystal Fiber MM-HNA-5 Product Description", "http://www.crystal-fibre.com/datasheets/MM-HNA-5.pdf", Apr. 2005.

Crystal Fibre (Company), "Towards 100 kW fiber laser systems Scaling up power in fiber lasers for beam combining", "http://www.crystal-fibre.com/support/White_Paper_-_Towards_100kW_fiber_laser_systems_-_Scaling_up_power_infiber_lasers_for_beam_combining.pdf", Feb. 28, 2006.

Davitt, Kristina, et al., "290 and 340 nm UV LED arrays for fluorescence detection from single airborne particles", "Optics Express", Nov. 14, 2005, pp. 9548-9555, vol. 13, No. 23.

Di Teodoro, Fabio, et al., "Diffraction-limited, 300-kW peak-power pulses from a coiled multimode fiber amplifier", "Optics Letters", Apr. 1, 2002, pp. 518-520, vol. 27, No. 7.

Di Teodoro, Fabio, et al., "1.1 MW peak-power, 7 W average-power, high-spectral-brightness, diffraction-limited pulses from a photonic crystal fiber", "Optics Letters", Oct. 15, 2005, pp. 2694-2696, vol. 30, No. 20.

Di Teodoro, Fabio, et al., "Harmonic generation of an Yb-doped photonic-crystal fiber amplifier to obtain 1ns pulses of 410, 160, and 190kW peak-pow", "Advanced Solid-State Photonics 29 Technical Digest, Paper ME3", 2006.

Dunne, Mike, "Laser-driven particle accelerators", "Science", Apr. 21, 2006, pp. 374-376, vol. 312.

Emori, et al., "High-power Cascaded Raman Fiber Laser with 41-W output power at 1480-nm band", "Optical Society of America", May 2007, pp. 1-2.

Fan, T.Y., "Laser Beam Combining for High-Power, High Radiance Sources", "IEEE Journal of Selected Topics in Quantum Electronics", May/Jun. 2005, pp. 567-577, vol. 11.

Furusawa, et al., "Cladding pumped Ytterbium-doped fiber laser with holey inner and outer cladding.", "Optics Express", Dec. 17, 2001, pp. 714-720, vol. 9, No. 13.

Galvanauskas, Almantas, "Mode-scalable fiber-based chirped pulse amplification systems", "IEEE Journal on Selected Topics in Quantum Electronics", Jul. 2001, pp. 504-517, vol. 7, No. 4.

Galvanauskas, A., et al., "Fiber-laser-based femtosecond parametric generator in bulk periodically poled LiNbO3", "Optics Letters", Jan. 15, 1997, pp. 105-107, vol. 22, No. 2.

Hehl, Karl, et al., "High-efficiency dielectric reflection gratings: design, fabrication, and analysis", "Appl. Opt.", 1999, pp. 6257-6271, vol. 38.

(56) References Cited

OTHER PUBLICATIONS

Henderson, Angus, et al., "Low threshold, singly-resonant CW OPO pumped by an all-fiber pump source", "Optics Express", Jan. 3, 2006, pp. 767-772, vol. 14, No. 2.

Krause, J.T., et al., "Arc Fusion Splices with Near Pristine Strengths and Improved Optical Loss", "22nd European Conference on Optical Communication", 1996, pp. 2.237-2.240.

Kristiansen, Rene E., et al., "Microstructured fibers and their applications", "Proceedings of the 4th Reunion Espanola of Optoelectronics (OPTOEL), CI-5", 2005, pp. 37-49.

Liem, A., et al., "100-W single-frequency master-oscillator fiber power amplifier", "Optics Letters", Sep. 1, 2003, pp. 1537-1539, vol. 28, No. 17.

Limpert, J., et al., "High power Q-switched Yb-doped photonic crystal fiber laser producing sub-10 ns pulses", "Appl. Phys. B 81", 2005, pp. 19-21.

Limpert, J., et al., "Low-nonlinearity single-transverse-mode ytterbium-doped photonic crystal fiber amplifier", "Optics Express", Apr. 5, 2004, pp. 1313-1319, vol. 12, No. 7.

Limpert, J., et al., "High-power rod-type photonic crystal fiber laser", "Optics Express", Feb. 21, 2005, pp. 1055-1058, vol. 13, No. 4.

Liu, F., et al., "Cost-effective wavelength selectable light source using DFB fibre laser array", "Electronics Letters", Mar. 30, 2000, pp. 620-621, vol. 36, No. 7.

Liu, A., et al., "Spectral beam combining of high power fiber lasers", "Proceedings of SPIE", Jun. 7, 2004, pp. 81-88, vol. 5335.

Loftus, T.H., et al., "Spectrally Beam-Combined Fiber Lasers for High-Average-Power Applications", "IEEE Journal of Selected Topics in Quantum Electronics", May 1, 2007, pp. 487-497, vol. 13, No. 3.

Madasamy, P., et al., "Dual-Grating Spectral Beam Combination of High-Power Fiber Lasers", "IEEE Journal of Selected Topics in Quantum Electronics", Mar. 1, 2009, pp. 337-343, vol. 15, No. 2.

Miguelez, et al., "Optical Segmentation Technology Alternative and Architectures", "Motorola", 2008, pp. 1-12.

Moutzouris, Konstantinos, et al., "Highly efficient second, third and fourth harmonic generation from a two-branch femtosecond erbium fiber source", "Optics Express", Mar. 6, 2006, pp. 1905-1912, vol. 14, No. 5.

Perry, M.D., et al., "High-efficiency multilayer dielectric diffraction gratings", "Opt. Lett.", 1995, pp. 940-942, vol. 20.

Roser, F., et al., "131 W 220 fs fiber laser system", "Optics Letters", Oct. 15, 2005, pp. 2754-2756, vol. 30, No. 20.

Schreiber, T., et al., "Stress-induced single-polarization single-transverse mode photonic crystal fiber with low nonlinearity", "Optics Express", Sep. 19, 2005, pp. 7621-7630, vol. 13, No. 19.

"Sensor Systems for Biological Agent Attacks: Protecting Buildings and Military Bases", 2005, p. 73 Publisher: Committee on Materials and Manufacturing Processes for Advanced Sensors, National Research Council.

Sorensen, T., et al., "Metal-assisted coupling to hollow-core photonic crystal fibres", "Electronics Letters", Jun. 9, 2005, vol. 41, No. 12.

Tunnermann, A., et al., "The renaissance and bright future of fibre lasers", "Journal of Physics B: Atomic, Molecular and Optical Physics", 2005, pp. S681-S693, vol. 38.

Kennedy, et al., "Creation of Laguerre-Gaussian laser modes using diffractive optics", "Phys Rev A 66, 043801", 2002, pp. 043801-1 to 043801-5.

Mansell, Justin, "Clipping Loss for Square and Circular Gaussian and Super-Gaussian Beams through a Cassegrain Telescope Aperture", "downloaded Jul. 8, 2015 from http://www.activeopticalsystems.com/docs/AN028_Annular%20Clipping%20Loss.pdf", May 3, 2011, Publisher: Active Optical Systems, LLC.

Kasinski, et al., "Near-diffraction-limited laser beam shaping with diamond-turned aspheric optics.", "Opt Lett.", 1997, pp. 1062-1065, vol. 22.

Sueda, et al., "Laguerre-Gaussian beam generated with a multilevel spiral phase plate for high intensity laser pulses", "Optics Express", Jul. 26, 2004, pp. 3548-3553, vol. 12, No. 15.

PCT Search Report/Written Opinion for related PCT/US2015/015977 application, mailed Nov. 23, 2015, 16 pages.

\* cited by examiner

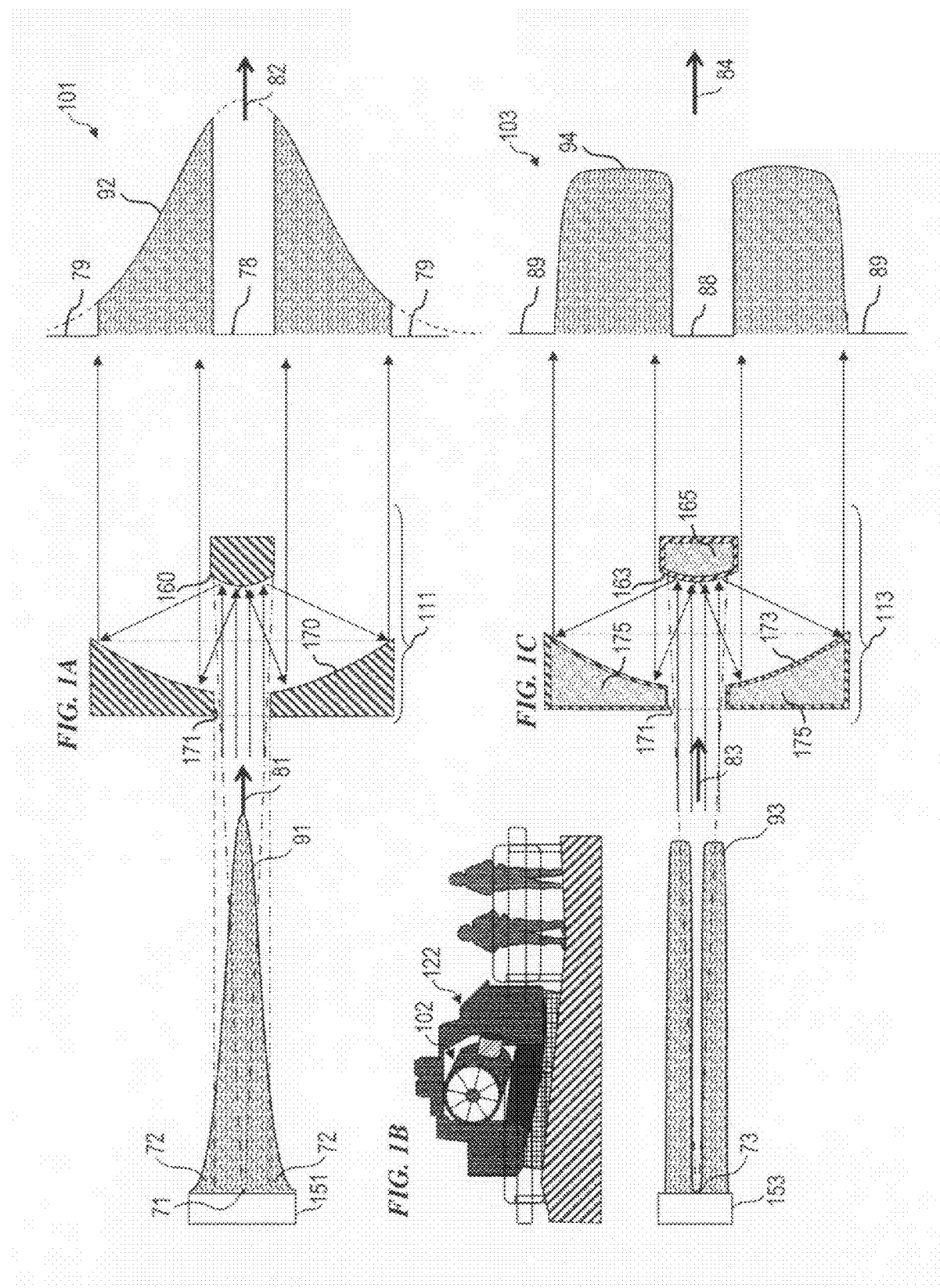

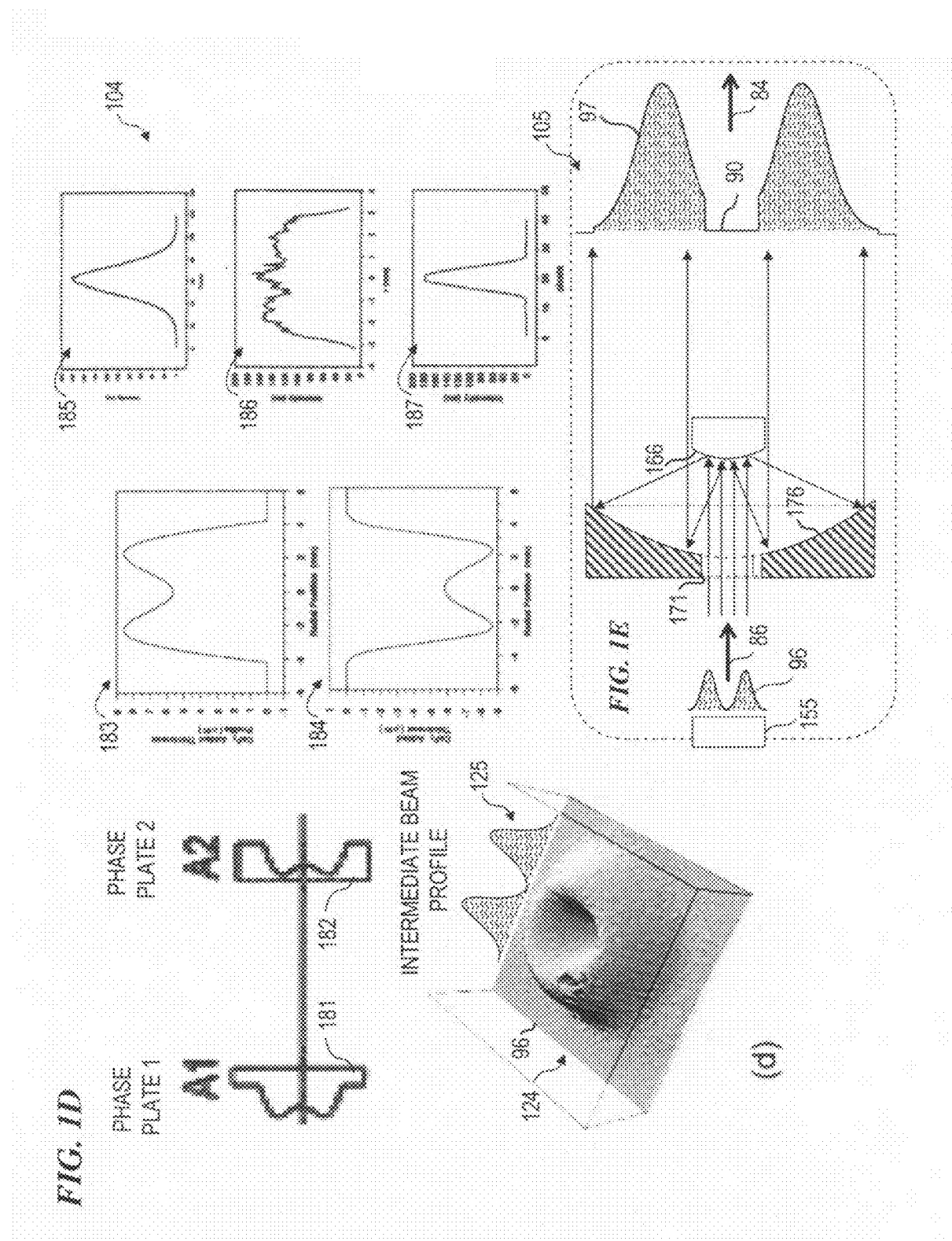

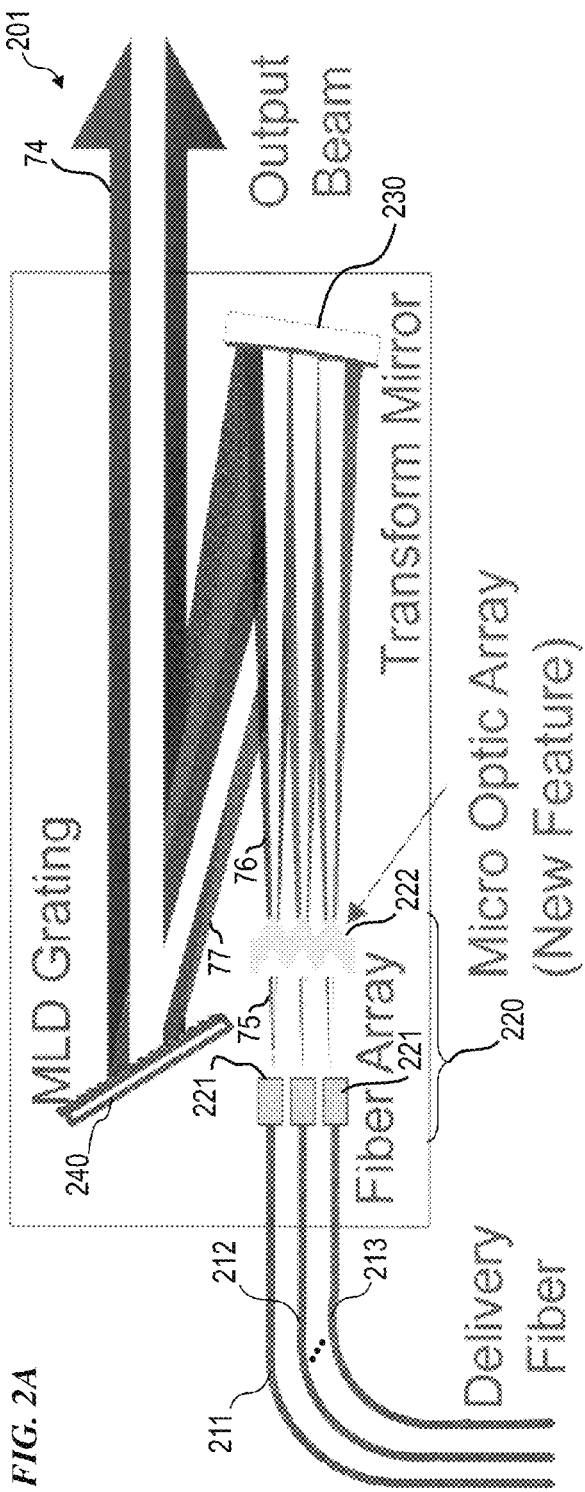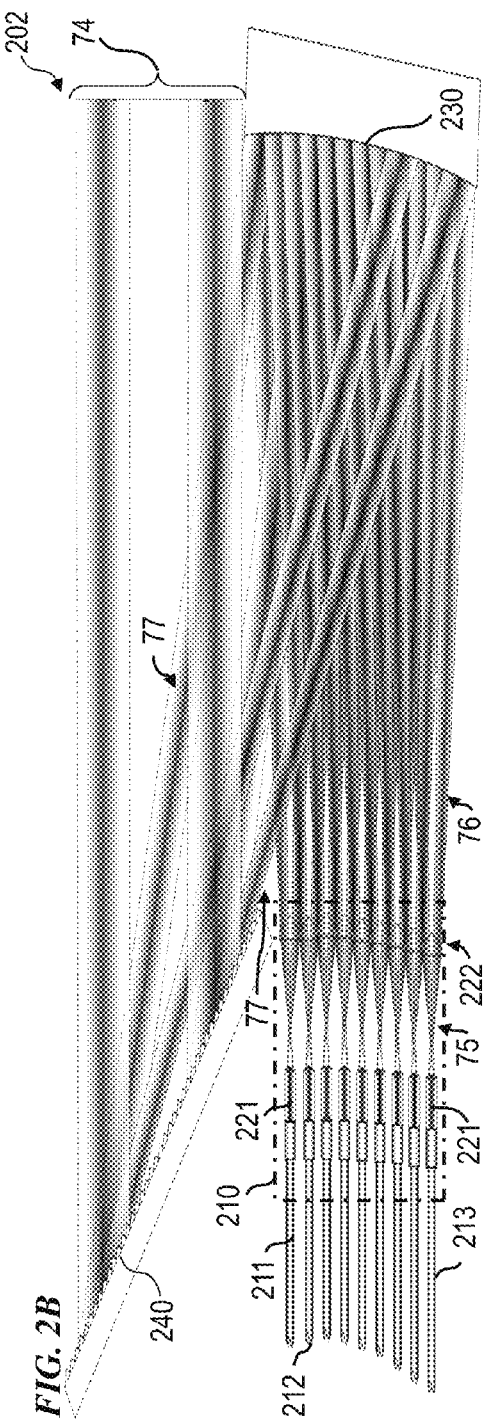
FIG. 2A
FIG. 2B

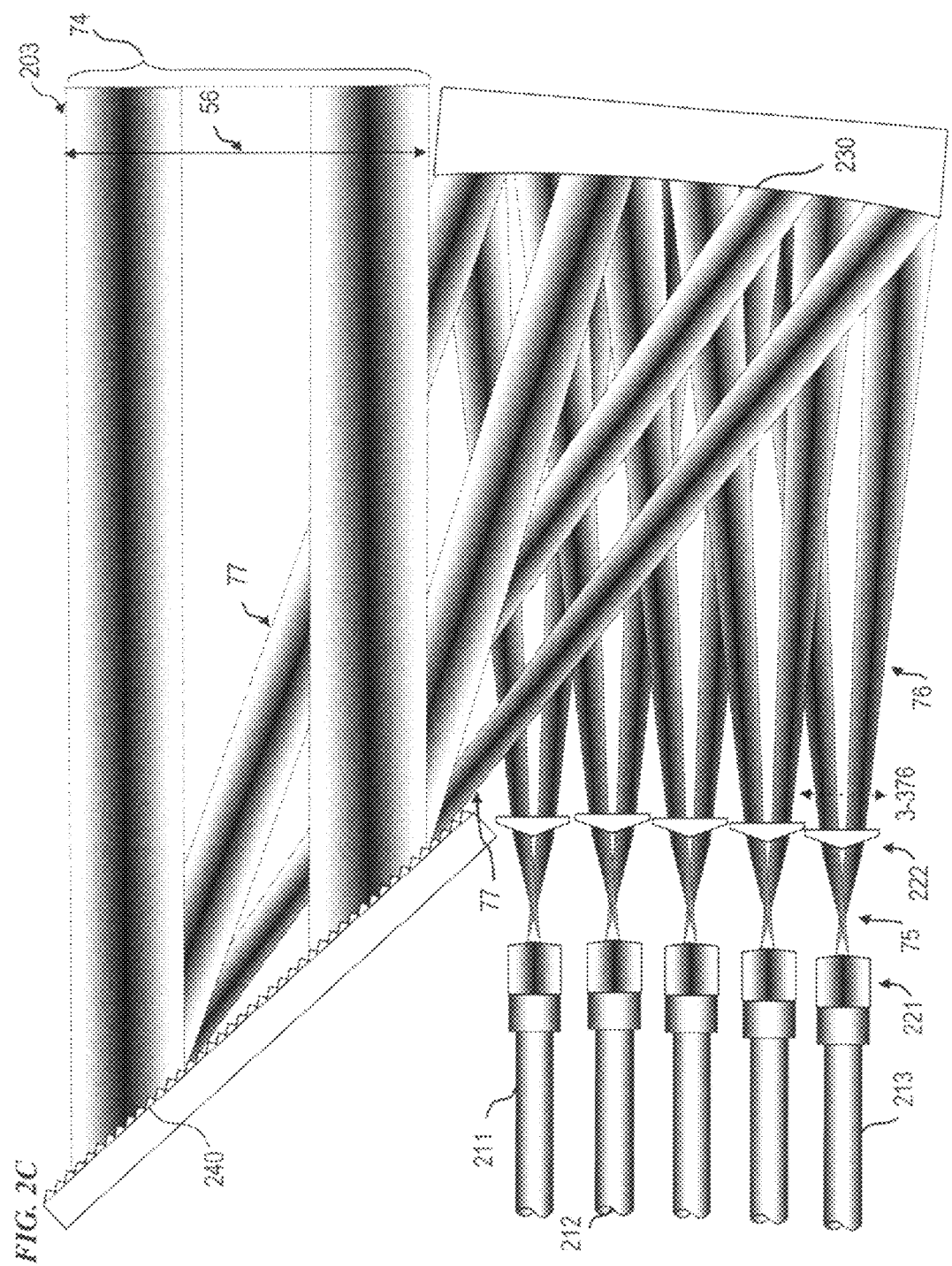

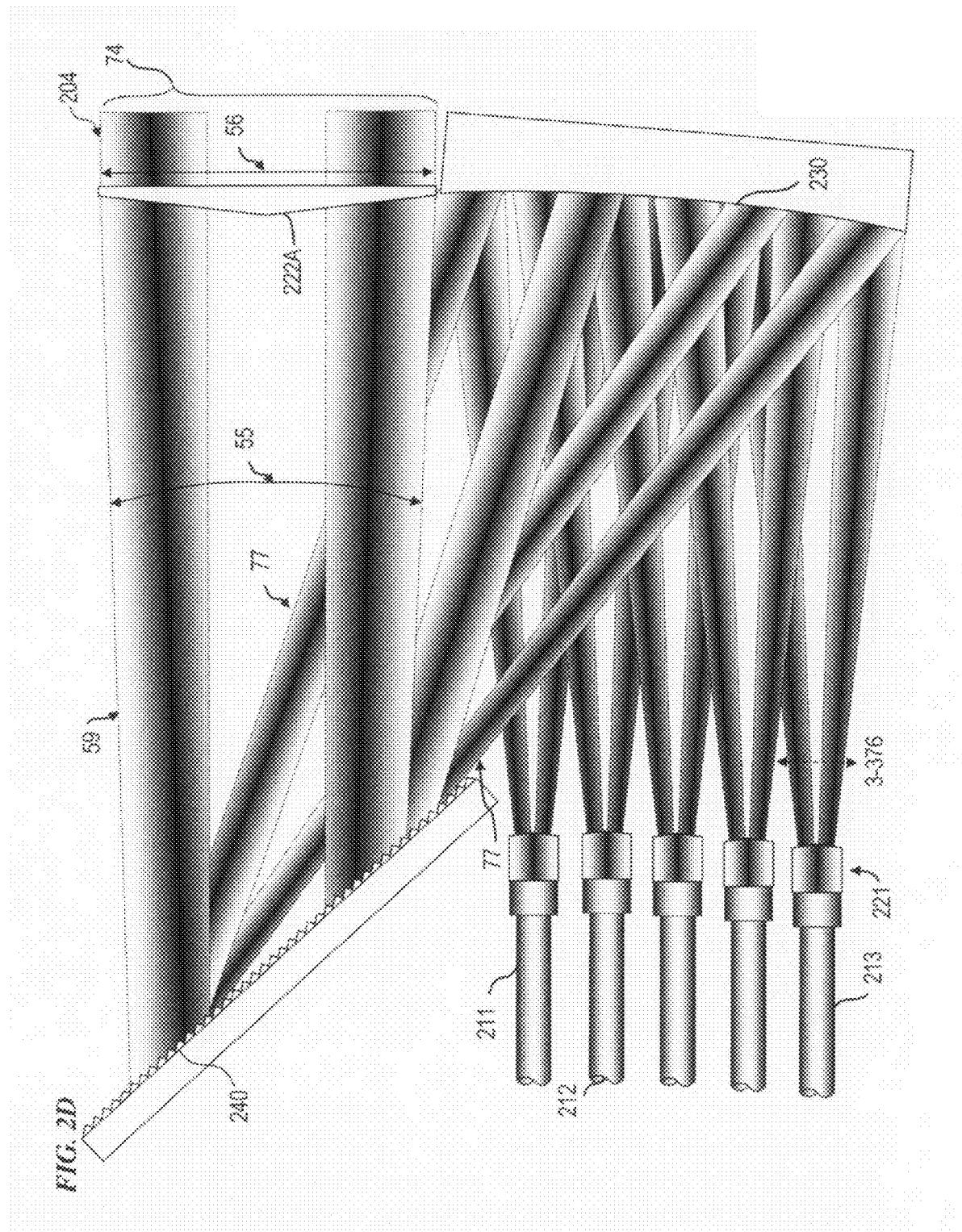

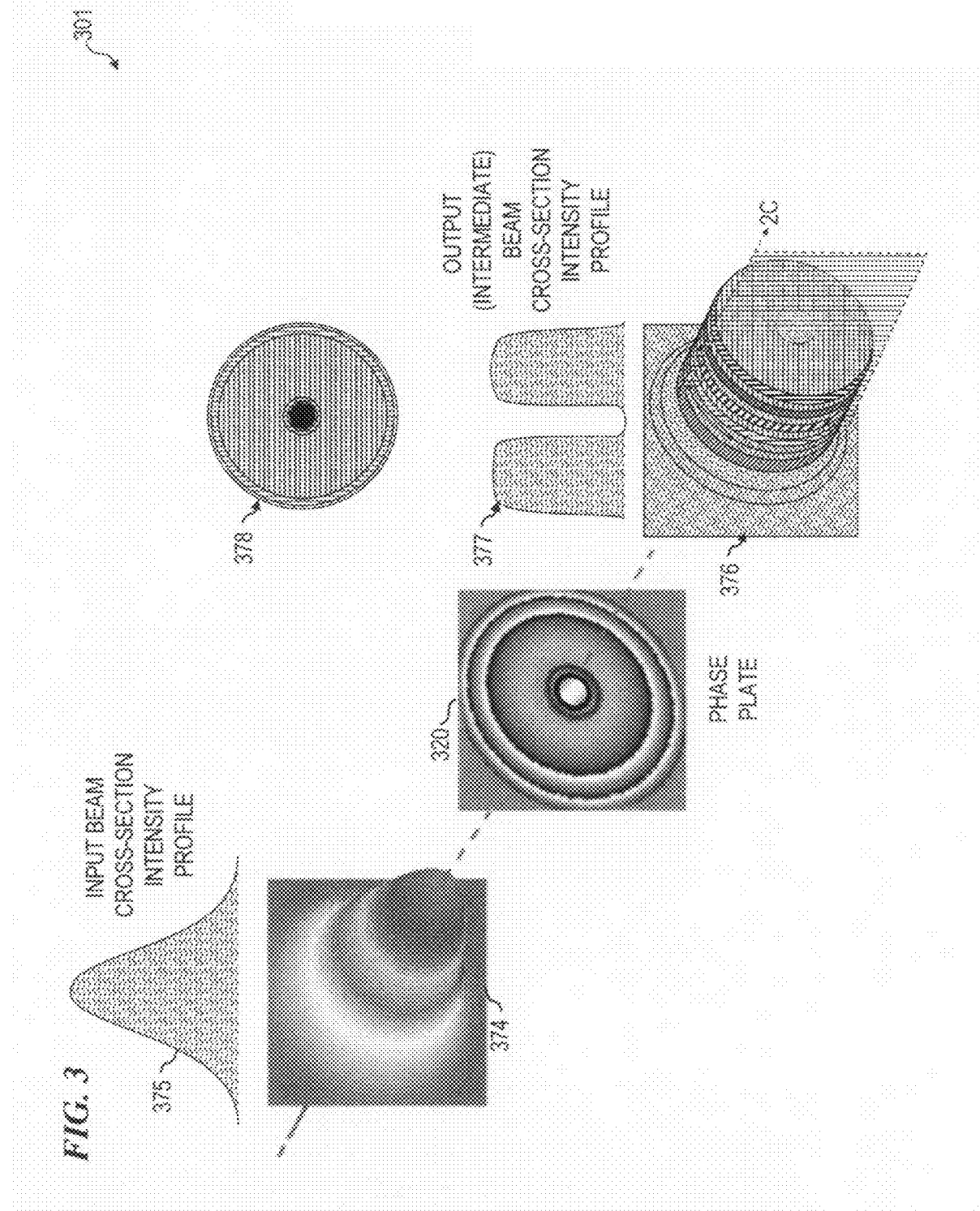

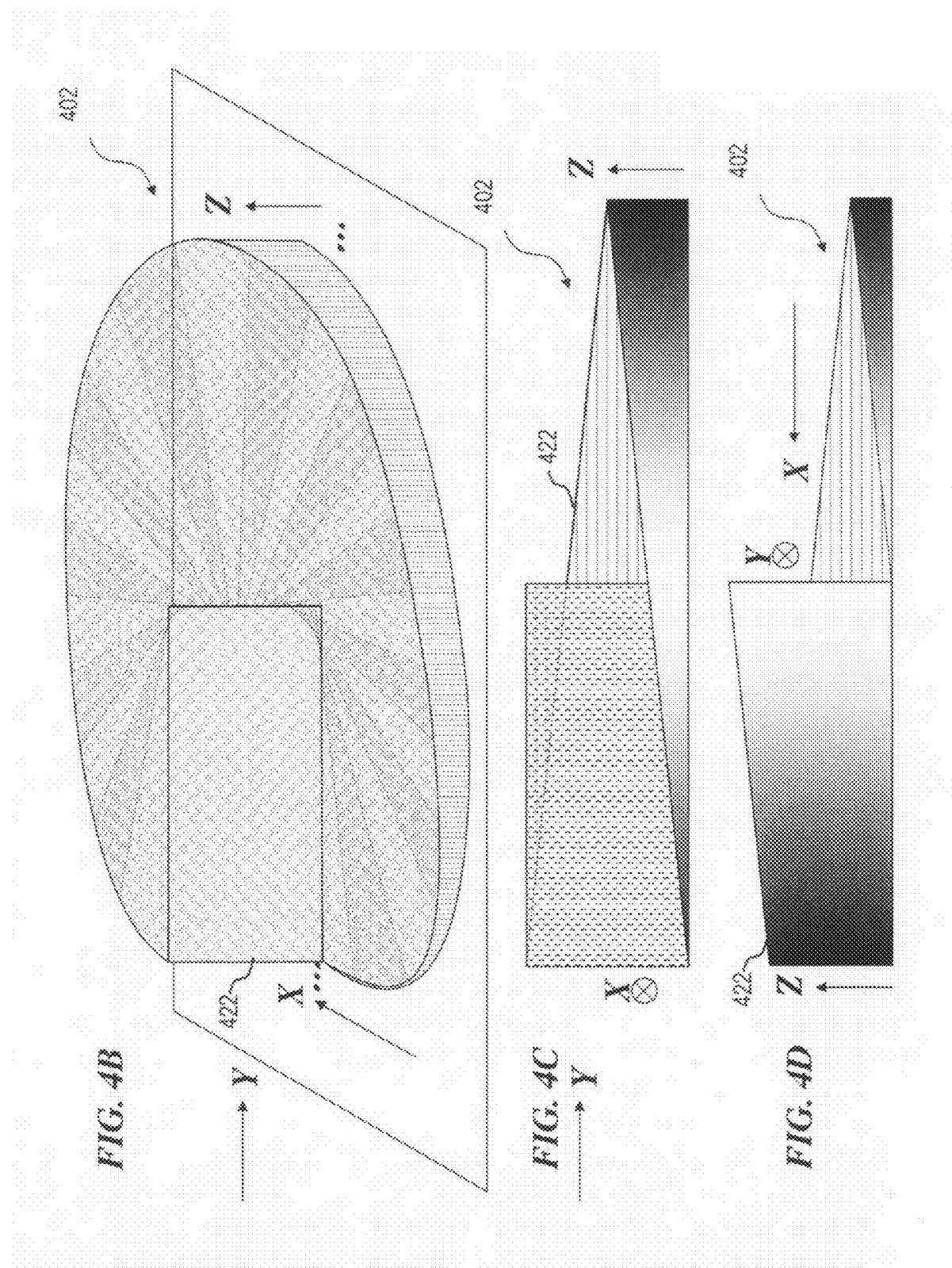

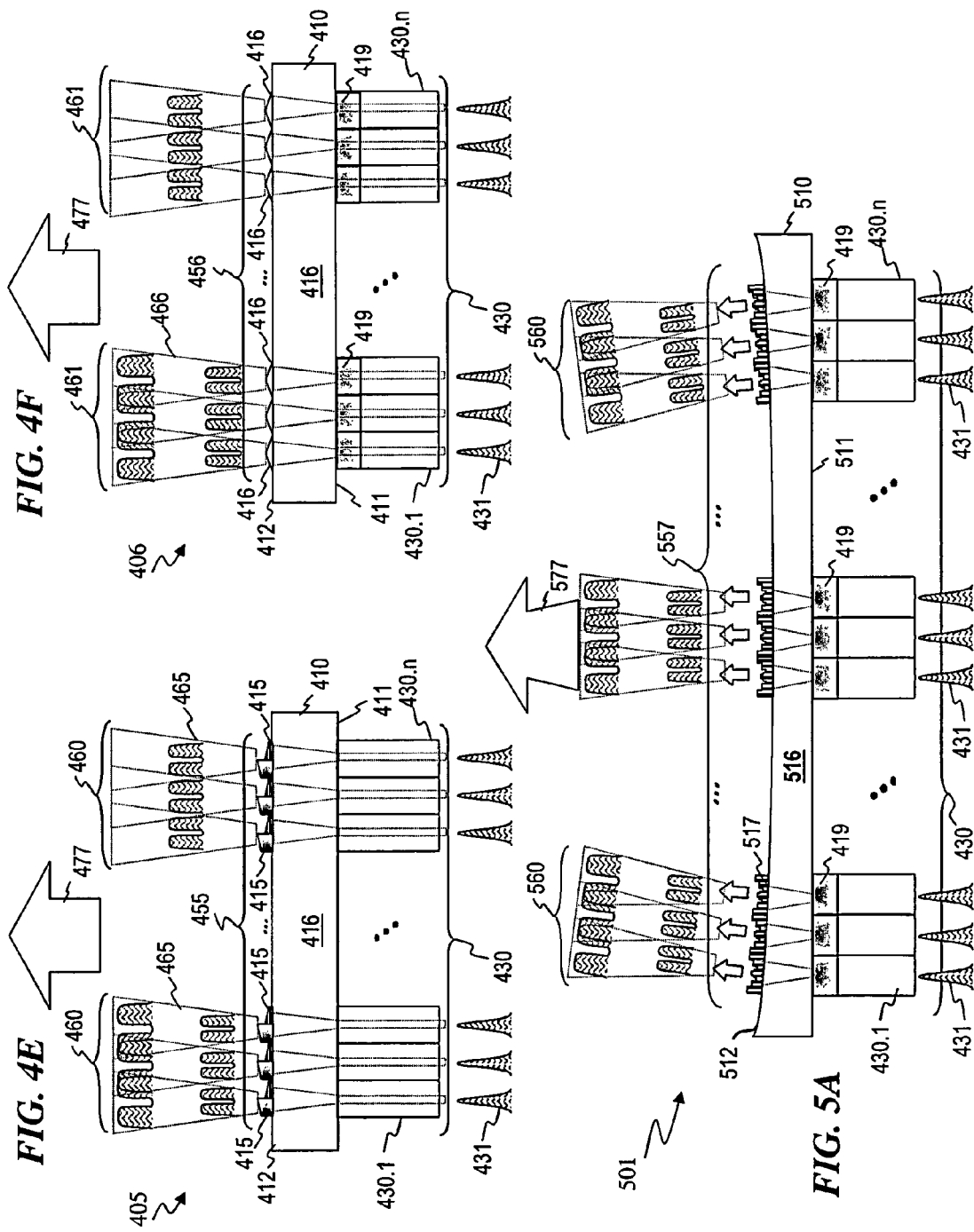

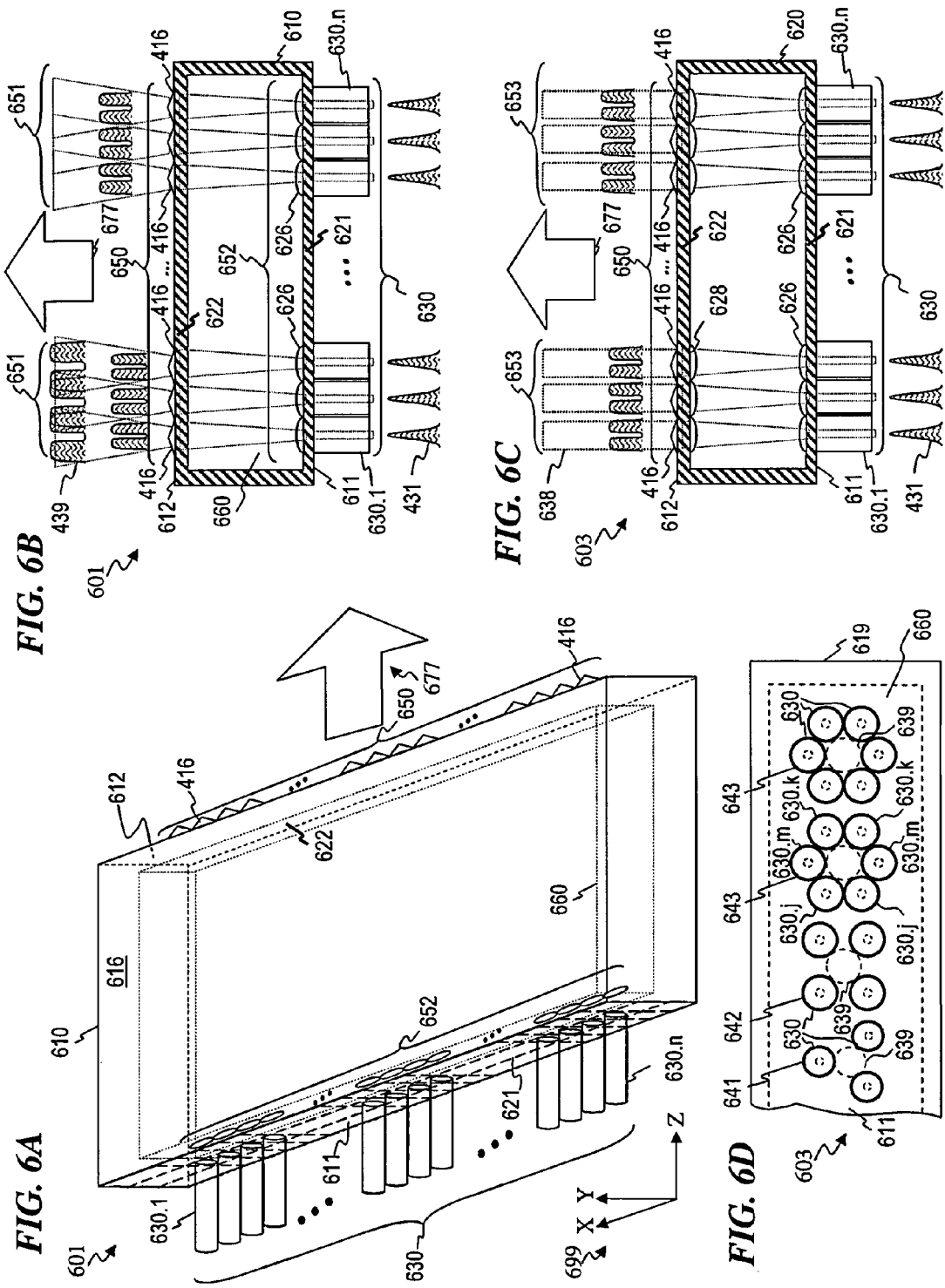

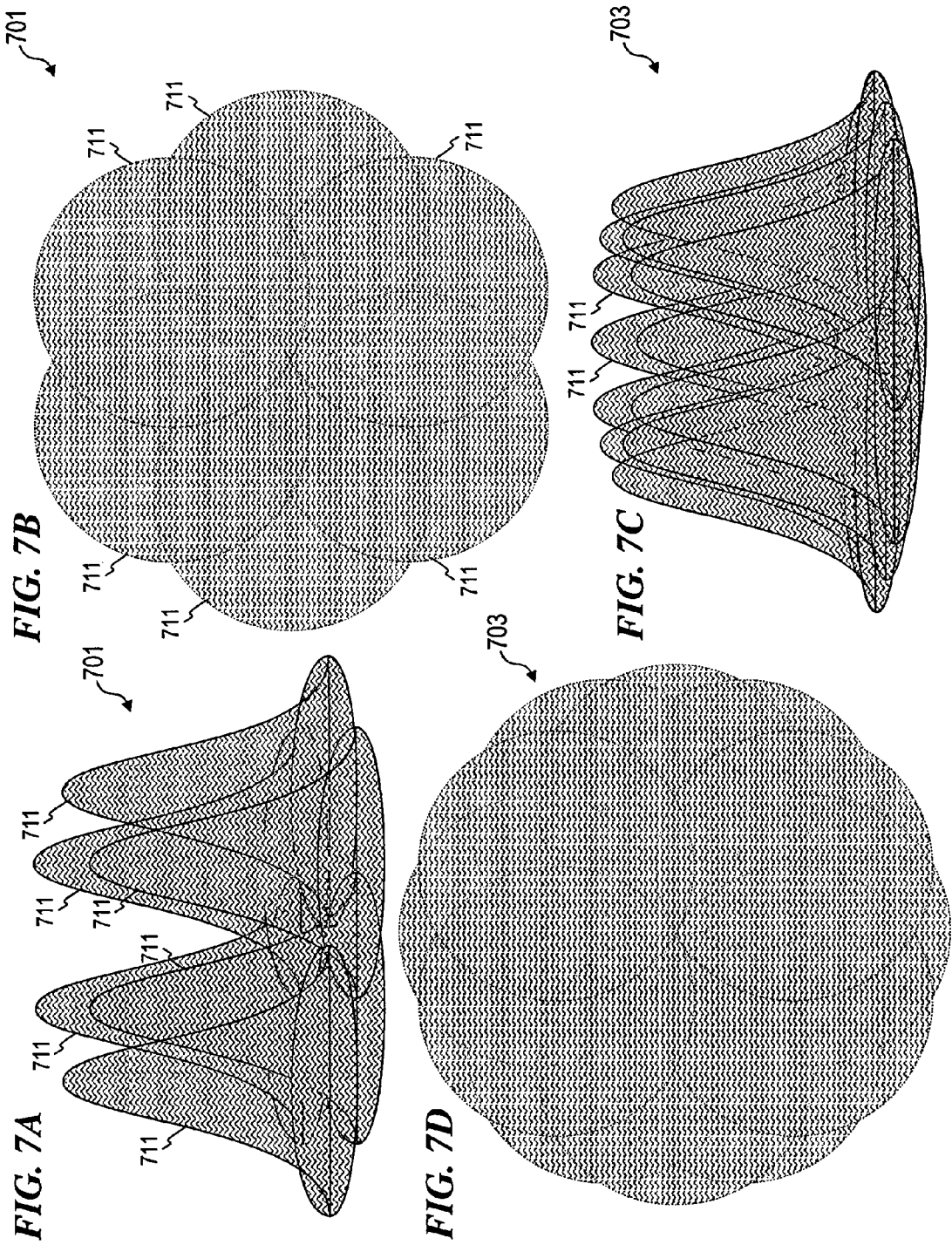

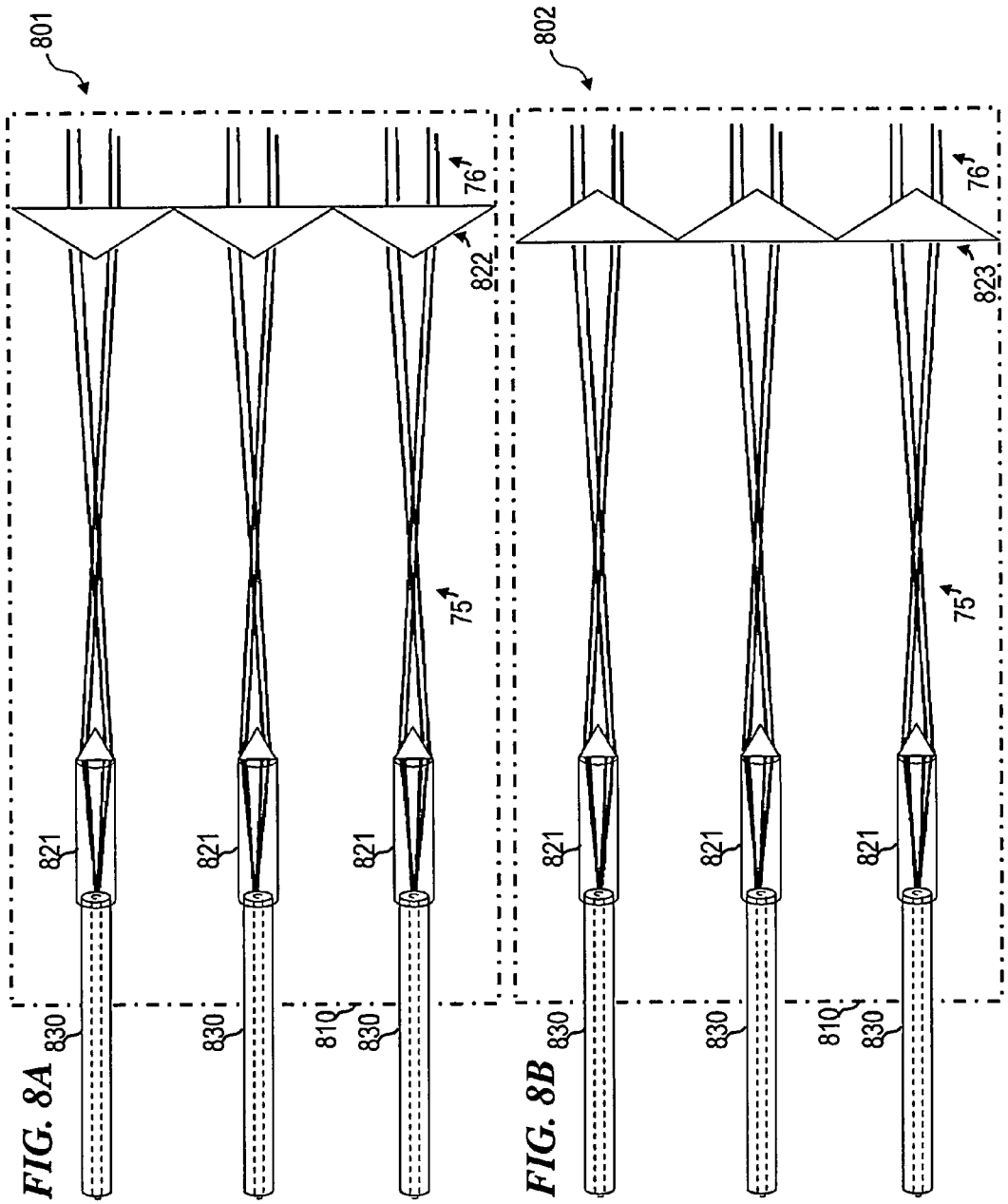

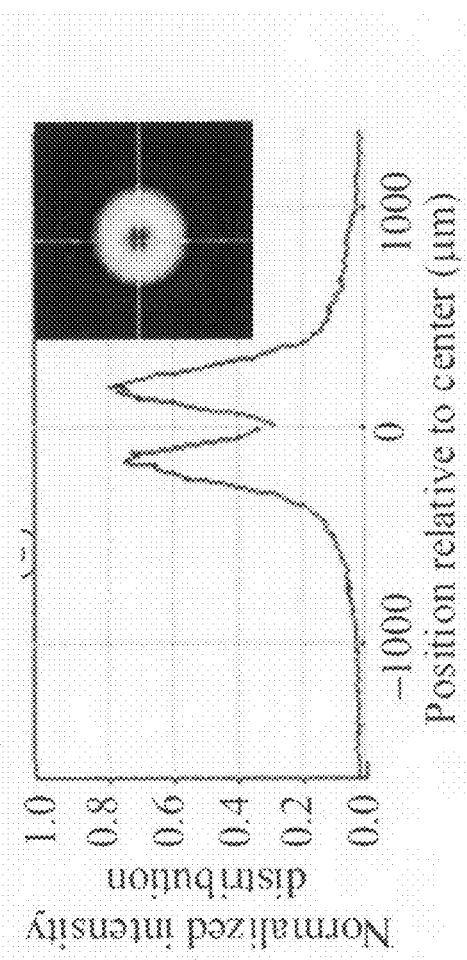
FIG. 9A (PRIOR ART)
FIG. 9B (PRIOR ART)
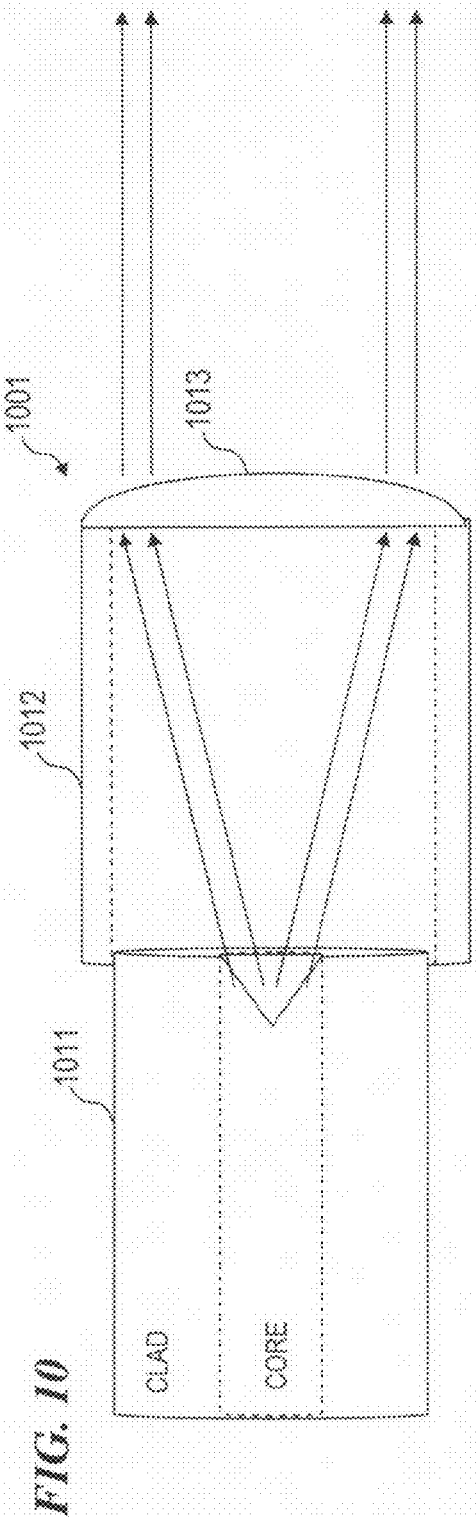
FIG. 10

APPARATUS AND METHOD FOR FIBER-LASER OUTPUT-BEAM SHAPING FOR SPECTRAL BEAM COMBINATION

CROSS-REFERENCE TO RELATED APPLICATIONS

This application is related to:
U.S. Pat. No. 7,375,877, which issued May 20, 2008 to Di Teodoro et al., with the title "METHOD AND APPARATUS FOR LONG-RANGE LIDAR AND ACTIVE IMAGING WITH OPTICAL OUTPUT FROM A PHOTONIC-CRYSTAL ROD";
U.S. Pat. No. 8,472,763 to Liu, et al., which issued Jun. 25, 2013 with the title "SPECTRAL BEAM COMBINATION OF LASER BEAMS";
U.S. Pat. No. 7,671,337 to Tidwell, which issued Mar. 2, 2010 with the title "SYSTEM AND METHOD FOR POINTING A LASER BEAM";
U.S. Pat. No. 7,446,315 to Tidwell et al., which issued May 15, 2012 with the title "SYSTEM AND METHOD FOR AIRCRAFT INFRARED COUNTERMEASURES TO MISSILES";
U.S. Pat. No. 7,199,924, which issued Apr. 3, 2007 to Brown et al., with the title "APPARATUS AND METHOD FOR SPECTRAL-BEAM COMBINING OF HIGH-POWER FIBER LASERS";
U.S. Pat. No. 7,768,700, which issued Aug. 3, 2010 to Savage-Leuchs, with the title "METHOD AND APPARATUS FOR OPTICAL GAIN FIBER HAVING SEGMENTS OF DIFFERING CORE SIZES";
U.S. Pat. No. 7,835,608, which issued Nov. 16, 2010 to Minelly et al., with the title "METHOD AND APPARATUS FOR OPTICAL DELIVERY FIBER HAVING CLADDING WITH ABSORBING REGIONS";
U.S. Pat. No. 7,872,794, which issued to Minelly et al. on Jan. 18, 2011 with the title "HIGH-ENERGY EYE-SAFE PULSED FIBER AMPLIFIERS AND SOURCES OPERATING IN ERBIUM'S L-BAND";
U.S. Pat. No. 7,876,803, which issued to Di Teodoro et al. on Jan. 25, 2011 with the title "High-power, pulsed ring fiber oscillator and method,"
U.S. Pat. No. 8,179,594 to Tidwell et al., which issued May 15, 2012 with the title "METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS";
U.S. patent application Ser. No. 12/799,982, which was filed Apr. 28, 2010 by Roy D. Mead with the title "HIGH-POWER LASER USING THULIUM-DOPED FIBER AMPLIFIER AND FREQUENCY QUADRUPLING FOR BLUE OUTPUT" (which issued as U.S. Pat. No. 8,953,647 on Feb. 10, 2015);
U.S. Pat. No. 8,441,718, which issued May 14, 2013 to Mead with the title "SPECTRALLY BEAM COMBINED LASER SYSTEM AND METHOD AT EYE-SAFER WAVELENGTHS"; and
U.S. Patent Publication No. US 2011/0091155 of Yilmaz et al., published Apr. 21, 2011 with the title "IN-LINE FORWARD/BACKWARD FIBER-OPTIC SIGNAL ANALYZER" (which issued as U.S. Pat. No. 8,755,649 on Jun. 17, 2014); which are all assigned to the owner of the present application, and which are all incorporated herein by reference.

FIELD OF THE INVENTION

The invention relates generally to high-power optical spectral beam combining using diffractive grating(s) and lasers, and more particularly to methods and apparatus for shaping high-power laser beams so they can be efficiently combined into a single output beam having an annular spatial profile.

BACKGROUND OF THE INVENTION

High-efficiency diffraction gratings are often useful in laser systems that employ very-high-power laser beams. In particular, systems that use spectral-beam combining to increase the total power of a single collimated laser beam to power levels of one megawatt or more have a need for high-efficiency (low-loss) diffraction gratings.

U.S. Pat. No. 7,199,924 to Brown et al. issued Apr. 3, 2007, titled "APPARATUS AND METHOD FOR SPECTRAL-BEAM COMBINING OF HIGH-POWER FIBER LASERS," is assigned to the owner of the present application, and is incorporated herein by reference. In U.S. Pat. No. 7,199,924 Brown et al. describe an apparatus and method for spectral-beam combining light from a plurality of high-power fiber lasers that, in some embodiments, use two substantially identical diffraction gratings in a parallel, mutually compensating configuration to combine a plurality of separate parallel input beams each having a slightly different successively higher wavelength into a single output beam of high quality. In other embodiments, a single diffraction grating is used to combine a plurality of different wavelengths, wherein the input laser beams are obtained from very narrow linewidth sources to reduce chromatic dispersion. In some embodiments, diagnostics and adjustments of wavelengths and/or positions and angles are made dynamically in real time to maintain the combination of the plurality input beams into a single high-quality output beam.

United States Patent Publication 2011/0091155 by Yilmaz et al., titled "IN-LINE FORWARD/BACKWARD FIBER-OPTIC SIGNAL ANALYZER," is assigned to the owner of the present application, and is incorporated herein by reference. In Publication 2011/0091155 (which issued as U.S. Pat. No. 8,755,649 on Jun. 17, 2014), Yilmaz et al. describe an optical connector having a plurality of directional taps and connecting between a plurality of optical waveguides (such as a connector between a waveguide that is part of, or leads from, a seed laser and/or an initial optical-gain-fiber power amplifier, and a waveguide that is part of, or leads to, an output optical-gain-fiber power amplifier and/or a delivery fiber), wherein one of the directional taps extracts a small amount of the forward-traveling optical output signal from the seed laser or initial power amplifier (wherein this forward-tapped signal is optionally monitored using a sensor for the forward-tapped signal), and wherein another of the directional taps extracts at least some of any backward-traveling optical signal that may have been reflected (wherein this backward-tapped signal is optionally monitored using a sensor for the backward-tapped signal).

U.S. Pat. No. 7,872,794 issued to Minelly et al. on Jan. 18, 2011 with the title "HIGH-ENERGY EYE-SAFE PULSED FIBER AMPLIFIERS AND SOURCES OPERATING IN ERBIUM'S L-BAND," is assigned to the owner of the present application, and is incorporated herein by reference. In U.S. Pat. No. 7,872,794, Minelly et al. describe an apparatus and method that provide an optical-fiber amplifier having at least one erbium-doped fiber section and an optical pump coupled to the erbium-doped fiber section, wherein the apparatus is operable to amplify signal pulses to high energy in the erbium-doped fiber section, the pulses having a wavelength in the range of about 1565 nm to about 1630 nm. In some embodiments, the amplifying fiber is ytterbium-free.

U.S. Pat. No. 7,876,803 issued to Di Teodoro et al. on Jan. 25, 2011 with the title "High-power, pulsed ring fiber oscillator and method," is assigned to the owner of the present application, and is incorporated herein by reference. In U.S. Pat. No. 7,876,803, Di Teodoro et al. describe a ring laser includes a large-core rare-earth-doped fiber ring-connected with a free-space path having an electro-optic switch, output coupler, and intracavity band-pass filter to enforce lasing operation in narrow wavelength range. In some cavity-dumped modes, the laser is configured in a similar manner, except that an output coupler is omitted since the optical power is extracted from the laser cavity by the electro-optic switch itself. The same laser can be configured to operate in Q-switched and/or cavity-dumping modes as well as in hybrid modes (e.g., partial Q-switch, followed by cavity dumping, or even CW (continuous wave)). In some embodiments, the laser can be used as, or inject laser light into, a regenerative solid-state amplifier, or a Raman laser, or can be also used to generate visible, ultra-violet, mid-infrared, and far-infrared (THz) radiation via nonlinear wavelength conversion processes. The various embodiments can use a power oscillator or seed-plus-amplifier MOPA configuration.

U.S. Pat. No. 8,526,110 to Honea et al. issued Sep. 3, 2013, titled "SPECTRAL-BEAM COMBINING FOR HIGH-POWER FIBER-RING-LASER SYSTEMS," is assigned to the owner of the present application, and is incorporated herein by reference. In U.S. Pat. No. 8,526,110 Honea et al. describe a ring-laser system that includes a plurality of ring-laser gain elements and a spectral-beam-combining output stage configured to combine a plurality of beams coming from the gain elements into an output beam and that includes chromatic-dispersion compensation. In some embodiments, the output stage includes a plurality of highly reflective dielectric-coated focussing elements. In some embodiments, the output stage includes a plurality of high-efficiency dielectric-coated grating elements. In some embodiments, the output stage includes a mostly reflective but partially transmissive output mirror and a highly reflective beam-reversing mirror configured to reflect a majority of a backward-traveling signal beam such that it becomes forward traveling. In some embodiments, each gain element further includes a photonic-crystal-rod power amplifier. Some embodiments have an amplitude modulator configured to pulse the plurality of beams, and a timing controller configured to synchronize the pulses of the plurality of beams. Some embodiments further include a non-linear wavelength-conversion device.

U.S. Pat. No. 8,503,840 to Hu et al. issued Aug. 6, 2013 titled "OPTICAL-FIBER ARRAY METHOD AND APPARATUS," is assigned to the owner of the present application, and is incorporated herein by reference. In U.S. Pat. No. 8,503,840, Hu et al. describe a method and apparatus for forming an optical-fiber-array assembly, which includes providing a plurality of optical fibers including a first optical fiber and a second optical fiber, providing a fiber-array plate that includes a first surface and a second surface, connecting the plurality of optical fibers to the first surface of the fiber-array plate, transmitting a plurality of optical signals through the optical fibers into the fiber-array plate at the first surface of the fiber-array plate, and emitting from the second surface of the fiber-array plate a composite output beam having light from the plurality of optical signals. Optionally, the first surface of the fiber-array plate includes indicia configured to assist in the alignment of the plurality of optical fibers on the first surface of the fiber-array plate. In some embodiments, the second surface of the fiber-array plate includes a plurality of beam-shaping optics configured to shape the composite output beam.

U.S. Pat. No. 8,493,651 to Hu et al. issued Jul. 23, 2013 titled "Apparatus for optical fiber management and cooling," is assigned to the owner of the present application, and is incorporated herein by reference. In U.S. Pat. No. 8,493,651 an apparatus and method that provides management and cooling of an optical fiber by looping the optical fiber around the inner surface of a heat-conductive cylinder and around the outer surface of the heat-conductive cylinder, such that the optical fiber enters and exits the heat-conductive cylinder on substantially the same plane. Some embodiments use a continuous groove on the inside and outside of the cylinder for guiding and managing the optical fiber. Some embodiments use a plurality of protruding fiber guides for guiding and managing the optical fiber. Some embodiments use an integrated tube for guiding and managing the optical fiber. In some embodiments, the optical fiber looped on the inner surface and outer surface are spaced apart substantially equally. In some other embodiments, the optical fiber loops are spaced further apart for portions of the fiber carrying higher power.

U.S. Pat. No. 8,441,718 to Mead issued May 14, 2013 titled "Spectrally beam combined laser system and method at eye-safer wavelengths," is assigned to the owner of the present application, and is incorporated herein by reference. In U.S. Pat. No. 8,441,718, Mead describes a method and system in which fiber-laser light is Raman shifted to eye-safer wavelengths prior to spectral beam combination, enabling a high-power, eye-safer wavelength directed-energy (DE) system. The output of Ytterbium fiber lasers is not used directly for spectral beam combining. Rather, the power from the Yb fiber lasers is Raman-shifted to longer wavelengths, and these wavelengths are then spectrally beam combined. Raman shifting is most readily accomplished with a "cascaded Raman converter," in which a series of nested fiber cavities is formed using fiber Bragg gratings.

U.S. Pat. No. 8,411,712 to Honea, et al. issued Apr. 2, 2013 titled "Beam diagnostics and feedback system and method for spectrally beam-combined lasers," is assigned to the owner of the present application, and is incorporated herein by reference. In U.S. Pat. No. 8,411,712, Honea, et al. describe an apparatus and method for control of lasers (which use an array of optical gain fibers) in order to improve spectrally beam-combined (SBC) laser beam quality along the plane of the SBC fiber array via spectral-to-spatial mapping of a portion of the spectrally beam-combined laser beams, detection of optical power in each of the spatially dispersed beams and feedback control of the lasers for wavelength-drift correction. The apparatus includes a diffractive element; a source of a plurality of substantially monochromatic light beams directed from different angles to a single location on the diffractive element, wherein the diffractive element spectrally combines the plurality of light beams into a single beam. A controller adjusts characteristics of the light beams if one of the light beams has become misadjusted. In some embodiments, the controller adjusts the wavelength tuning of the respective fiber laser.

U.S. Pat. No. 8,199,399 to Savage-Leuchs issued Jun. 12, 2012, titled "Optical gain fiber having segments of differing core sizes and associated method," is assigned to the owner of the present application, and is incorporated herein by reference. In U.S. Pat. No. 8,199,399, Savage-Leuchs describes an apparatus and method for amplifying laser signals using segments of fibers of differing core diameters and/or differing cladding diameters to suppress amplified spontaneous emission and non-linear effects such as four-wave mixing (FWM), self-phase modulation, and stimulated Brillouin and/or Raman scattering (SBS/SRS). In some embodiments, different core sizes have different sideband spacings (spacing between the desired signal and wavelength-shifted lobes). Changing core sizes and providing phase mismatches prevent buildup of non-linear effects. Some embodiments further include a bandpass filter to remove signal other than the desired signal wavelength and/or a time gate to remove signal at times other than during the desired signal pulse. Some embodiments include photonic-crystal structures to define the core for the signal and/or the inner cladding for the pump. Some embodiments include an inner glass cladding to confine the signal in the core and an outer glass cladding to confine pump light in the inner cladding.

U.S. Pat. No. 8,179,594 to Tidwell, et al. issued May 15, 2012 titled "Method and apparatus for spectral-beam combining of fanned-in laser beams with chromatic-dispersion compensation using a plurality of diffractive gratings," is assigned to the owner of the present application, and is incorporated herein by reference. In U.S. Pat. No. 8,179,594, Tidwell, et al. describe an apparatus and method for spectral-beam combining of light from a plurality of high-power lasers (e.g., fiber MOPA lasers) that, in some embodiments, use substantially identical diffraction gratings in a 1-D non-parallel, mutually compensating configuration to combine non-parallel intersecting input beams in one plane each having a slightly different successively higher wavelength into a single output beam of high quality. In other embodiments, an output grating and one or more input gratings in a 1-D parallel, mutually compensating configuration combine non-parallel input beams in one plane into a single output beam of high quality. In other embodiments, a 2-D plurality of input gratings in a non-parallel configuration combine a plurality of non-parallel input beams not in one plane each having a slightly different successively higher wavelength into a set of intersecting beams in one plane directed towards an output grating that compensates for chromatic dispersions introduced by the input gratings.

U.S. Pat. No. 7,065,107 to Hamilton, et al. issued Jun. 20, 2006 titled "Spectral beam combination of broad-stripe laser diodes," is assigned to the owner of the present application, and is incorporated herein by reference. In U.S. Pat. No. 7,065,107, Hamilton, et al. describe a method and apparatus for improving the beam quality of the emissions from a multimode gain medium such as a broad-stripe laser through the use of SBC techniques is provided. In order to achieve the desired beam quality without a significant reduction in output power, discrete lasing regions are formed across the gain medium using an etalon or similar device located within the SBC cavity.

U.S. Pat. No. 8,094,689 to Koplow issued Jan. 10, 2012, titled "Laser systems configured to output a spectrally-consolidated laser beam and related methods," and is incorporated herein by reference. In U.S. Pat. No. 8,094,689, Koplow describes a laser apparatus that includes a plurality of pumps each of which is configured to emit a corresponding pump laser beam having a unique peak wavelength. The laser apparatus includes a spectral beam combiner configured to combine the corresponding pump laser beams into a substantially spatially-coherent pump laser beam having a pump spectrum that includes the unique peak wavelengths, and first and second selectively reflective elements spaced from each other to define a lasing cavity including a lasing medium therein. The lasing medium generates a plurality of gain spectra responsive to absorbing the pump laser beam. Each gain spectrum corresponds to a respective one of the unique peak wavelengths of the substantially spatially-coherent pump laser beam and partially overlaps with all other ones of the gain spectra. The reflective elements are configured to promote emission of a laser beam from the lasing medium with a peak wavelength common to each gain spectrum.

EXEMPLARY DIFFRACTIVE ELEMENTS that can be used in some embodiments of the present invention include:

U.S. Pat. No. 6,754,006 titled "Hybrid metallic-dielectric grating" issued Jun. 22, 2004 to Barton et al. and is incorporated herein by reference. This patent describes a diffraction grating having a metallic base layer and layers of dielectric materials of varying refractive index, where a bottom interface of the layers is adherent to the metallic base layer. The dielectric layers are periodically spaced on top of the metallic base layer, leaving the metallic base layer exposed in regions. This grating allows for the polarization-insensitive reflective properties of the base metallic layer to operate in conjunction with the polarization sensitive diffraction properties of the multilayer grating structure to provide near 100% diffraction efficiency over a reasonable wavelength bandwidth, independent of the polarization of the incident beam.

U.S. Pat. No. 6,822,796 to Takada et al. titled "Diffractive optical element" (incorporated herein by reference) describes a method for making blazed gratings having asymmetric grooves with dielectric coatings. U.S. Pat. No. 6,958,859 to Hoose et al. titled "Grating device with high diffraction efficiency" (incorporated herein by reference) describes a method for making blazed gratings having dielectric coatings.

U.S. Pat. No. 5,907,436 titled "Multilayer dielectric diffraction gratings" issued May 25, 1999 to Perry et al., and is incorporated herein by reference. This patent describes the design and fabrication of dielectric grating structures with high diffraction efficiency. The gratings have a multilayer structure of alternating index dielectric materials, with a grating structure on top of the multilayer, and obtain a diffraction grating of adjustable efficiency, and variable optical bandwidth.

Even with high-efficiency multi-layered dielectric diffraction gratings such as those described above, a non-negligible amount of energy is absorbed in the grating, which heats and distorts the grating. A diamond layer in thermal contact with the grating can improve heat transfer. EXEMPLARY DIAMOND-LAYER COOLING SUBSTRATES that can be used in some embodiments include:

PCT Publication No. WO 2013/062584, which published May 2, 2013, of PCT Patent Application PCT/US11/58352 titled "Devices including a diamond layer" filed Oct. 28, 2011 by Liang et al., is incorporated herein by reference. Liang et al. describe a device that includes a substrate layer, a diamond layer, and a device layer. The device layer is patterned. The diamond layer is to conform to a pattern associated with the device layer.

U.S. Pat. No. 6,830,813 to Ravi, which issued Dec. 14, 2004 and is titled "Stress-reducing structure for electronic devices," is incorporated herein by reference. Ravi describes an electronic apparatus having a heat transfer/stress-reducing layer combined with a device layer and methods of fabricating such electronic apparatus provide a means for incorporating a heat transfer layer in an integrated circuit. A structure with a diamond layer incorporated beneath a device layer provides a heat transfer layer for the structure. In an embodiment, a compliant layer is formed between a diamond layer and a substrate to provide stress reduction. In another embodiment, a diamond layer is formed as a layer of islands of diamond from nucleation centers to provide stress reduction.

U.S. Pat. No. 7,501,330 to Ravi, et al., which issued Mar. 10, 2009 and is titled "Methods of forming a high conductivity diamond film and structures formed thereby," is incorporated herein by reference. Ravi, et al. describe a method of forming a high thermal conductivity diamond film and its associated structures comprising selectively nucleating a region of a substrate, and forming a diamond film on the substrate such that the diamond film has large grains, which are at least about 20 microns in size. The larger grained diamond film has greatly improved thermal management capabilities and improves the efficiency and speed of a microelectronic device.

U.S. Pat. No. 7,846,767 to Sung issued Dec. 7, 2010 titled "Semiconductor-on-diamond devices and associated methods," and is incorporated herein by reference. U.S. Pat. No. 7,846,767 describes semiconductor-on-diamond (SOD) substrates and methods for making such substrates. In one aspect, a method of making an SOD device is provided that includes etching depressions into an etch surface of a semiconductor substrate to a uniform depth, depositing a diamond layer onto the etch surface to form diamond-filled depressions, and thinning the semiconductor substrate at a thinning surface opposite the etch surface until the diamond filled depressions are exposed, thus forming a semiconductor device having a thickness substantially equal to the uniform depth.

CONVENTIONAL DIFFRACTIVE BEAM SHAPERS include the following:

U.S. Pat. No. 4,813,762 issued to Leger et al. on Mar. 21, 1989 titled "Coherent beam combining of lasers using microlenses and diffractive coupling," and is incorporated herein by reference. U.S. Pat. No. 4,813,762 describes a diffractive lenslet array receives light from multiple lasers. The lenslet array is spaced apart from a partially reflecting mirror by a distance $Z=n \times d^2/\lambda$ where n is an integer or half integer, $\lambda$ is the laser wavelength and d is the spacing of the lenslets in the array. In a preferred embodiment the apparatus is a unitary design in which the lenslets are etched into one surface of a substrate and a parallel surface is coated to form the partially reflecting mirror. The lenslets abut one another to produce a fill factor (percentage of array containing light) close to one and each of the lenslets is a multistep diffractive lens. Diffractive spreading over a round trip distance from lasers to mirror and back again causes feedback light from a single lenslet to couple into adjacent lenslets. The light from all the lenslets is coupled back into the laser waveguides efficiently only when the wavefront at each of the lenslets is flat, that is, when the phase of the feedback is uniform across a lenslet. Uniformity is achieved when the separation between lenslet array and mirror is the Talbot self-imaging condition set forth above.

U.S. Pat. No. 5,454,004 to Leger issued Sep. 26, 1995 titled "Phase grating and mode-selecting mirror for a laser," and is incorporated herein by reference. U.S. Pat. No. 5,454,004 describes a method for making a custom phase-conjugating diffractive mirror for a laser resonator comprising the steps of: (a) choosing a specified beam mode profile $a_i(x,y)$ that will suit need of a designer, (b) calculating the mode profile $b(x',y')$ which is a value of the specified $a_i(x,y)$ that is propagated to the reflection surface of the diffractive mirror and (c) calculating mirror reflectance $t(x',y')$ which reflects phase conjugate of $b(x',y')$. A method for fabricating such a mirror is shown. Another aspect of the invention is the addition of a phase-adjusting element into a laser resonator, and compensating for the addition of a phase-adjusting element in the design of other phase-adjusting elements such as the mirrors.

Other Beam Shapers

United States Patent Application Publication 2011/0249320 by Savage-Leuchs et al. titled "High beam quality and high average power from large-core-size optical-fiber amplifiers" (which issued as U.S. Pat. No. 8,830,568 on Sep. 9, 2014), and United States Patent Application Publication 2011/0249321 by Savage-Leuchs et al. titled "Signal and pump mode-field adaptor for double-clad fibers and associated method" (which issued as U.S. Pat. No. 8,767,286 on Jul. 1, 2014), are assigned to the owner of the present application, and are incorporated herein by reference. In these publications, Savage-Leuchs et al. describe an apparatus, method and use for improving and merging core pumping and cladding pumping to enable high-power fiber-laser systems having excellent beam quality while using large-core (LMA) step-index gain fibers at very high optical power, wherein the core pumping includes mixing a laser seed optical signal (having a signal wavelength) with optical core-pump light (having a core-pump wavelength that is near the signal wavelength) in a manner that matches the modes of the seed optical signal and the pump light. Savage-Leuchs et al. also describe mode-matching double-clad fibers. In some embodiments, a first fiber section that has a first core, wherein the first core has a first core diameter connects to a mode-field adaptor, wherein the mode-field adaptor includes a first portion having a central volume that has a substantially constant index-of-refraction radial profile and a diameter larger than the first core diameter, and a second portion that has a graded-index (GRIN) central volume, wherein the GRIN central volume has a central axis and a graded index-of-refraction radial profile having an index that gradually decreases at larger distances from its central axis and a length selected to focus light into the core of a second fiber wherein the second core has a diameter that is larger than the first core diameter, and wherein the second fiber section is double clad. Some embodiments are polarized.

U.S. Pat. No. 7,128,943 (hereinafter, "Djeu"), titled "Methods for fabricating lenses at the end of optical fibers in the far field of the fiber aperture," issued Oct. 31, 2006, and incorporated herein by reference. Djeu describe a microlens affixed in the far field of an optical fiber to spatially transform a beam either entering or exiting the fiber. In a first embodiment, a droplet of photo polymer is placed on the end of an optical fiber and the fiber is spun to create an artificial gravity. The droplet is cured by UV radiation during the spinning. In some embodiments, the method described by Djeu is modified such that lenslets are suitably formed on surface 512 of base plate 510, wherein the lenslets provide the annularizing and the focussing of the beams 560.

There remains a need in the art for improved systems and methods for beam shaping in spectral-beam-combination systems, methods and devices.

SUMMARY OF THE INVENTION

The present invention provides an apparatus and method for reshaping the spatial intensity profile of each one of a plurality of fiber-laser source beams (sometimes called beamlets) in the free space region of a beam-combining system, such as that used for spectral beam combining (as described in U.S. Pat. No. 8,179,594 to Tidwell, et al., U.S. Pat. No. 7,199,924 to Brown et al., U.S. Pat. No. 8,526,110 to Honea et al., and U.S. Pat. No. 8,503,840 to Hu et al.), which are all incorporated herein by reference.

In some embodiments, the reshaping optics includes a refractive or diffractive pair of optics to reshape each beam, the optics being configured to match the beam size and pitch of the beams emitting from a fiber array. In some embodiments, these optics are fabricated in an array to match the beam size and pitch of the fiber-array beams using lithographic and etching techniques. Another embodiment uses a spiral phase plate in front of each fiber laser output to convert the Gaussian beam to a Laguerre Gaussian $LG_{10}$ mode. To produce a collimated beam for use with the spiral phase plate, a lens is used to collimate each beam prior to the spiral phase plate. In some embodiments, the lens is incorporated into the optic assembly holding the phase plate, e.g., in some embodiments, it is fabricated on one side of an optical surface with the spiral phase plate on the other side. In other embodiments, the lens is fused to the fiber tip to make the fiber output collimated at a size that manages the optical intensity to an acceptable level and Rayleigh range of the optical beam for ease of alignment. A third embodiment fuses an optical element, such as a micro axicon, on each fiber tip to shape the beam, with an optional optic to compensate for each beam. In some embodiments, the compensation optics are fabricated in an array using lithographic techniques. In some embodiments, a plurality of fibers are fused to a single focussing and annular-beam shaping assembly that forms annular beams that are then collimated and directed towards a spectral-beam-combining grating, which combines the annular beams impinging on the grating into a single annular beam. In some embodiments, the single spectrally combined annular beam is output through a Cassegrain optical projector, and in some embodiments, the beam is used for military purposes such as disabling aircraft, naval vessels, or other mobile vehicles.

In some embodiments, the present invention provides a method and apparatus for combining a plurality of laser beamlets to form a single annular beam using spectral beam combination. This invention includes a plurality of laser sources that emit a plurality of beamlets, wherein each one of the plurality of beamlets has a different wavelength; a beam annularizer that includes a plurality of optical units arranged to receive the beamlets, and configured to convert each beamlet into a respective annular beam that has an annular cross-sectional power profile; a beam-intersection transform element configured to point each respective one of the plurality of annular beams in an angular intersection arrangement toward a first location; and a spectral beam combiner at the first location configured to combine the plurality of wavelengths in the plurality of annular beams into a first annular spectrally combined beam.

Some embodiments of the apparatus further include a vehicle; an electrical power supply mounted to the vehicle; a laser controller mounted to the vehicle and operatively coupled to receive electrical power from the electrical power supply and operably coupled to power and control the plurality of laser sources; a Cassegrain projector mounted to the vehicle and operatively coupled to receive the first annular spectrally combined beam and configured to form a collimated second annular output beam from the optical energy of the first annular spectrally combined beam; and a beam-direction controller operably coupled to the Cassegrain projector and operable to direct the second annular output beam in one of a plurality of different possible directions relative to the vehicle. In various embodiments, the vehicle can be a land vehicle (e.g., with the Cassegrain projector mounted to a wheeled (e.g., truck trailer or Humvee®) or tracked (e.g., M1A2 Abrams tank) vehicle), a naval vehicle (e.g., a missile destroyer, submarine, or other warship), an aircraft, or a space-based satellite.

Some embodiments of the apparatus further include a materials-processing system; an electrical power supply connected to the materials-processing system; a laser controller in the materials-processing system and operatively coupled to receive electrical power from the electrical power supply and operably coupled to power and control the plurality of laser sources; and a Cassegrain projector mounted to the materials-processing system and operatively coupled to receive the first annular spectrally combined beam and configured to form a collimated second annular output beam from the optical energy of the first annular spectrally combined beam; wherein the Cassegrain projector is operable to direct the second annular output beam toward materials being processed all at once. In some embodiments, for example, the present invention is used annealing a large area of metal, or curing a paint-powder-coated workpiece, or solidifying and/or annealing a layer of powder deposited by a three-dimensional printer that has been partially solidified or hardened by a spot laser or a ink-jet spray of water or other liquid.

BRIEF DESCRIPTION OF THE DRAWINGS

FIG. 1A is a schematic cross-sectional side view of a laser-beam-director system 101 that uses a Cassegrain output-optic device and an input beam that has a Gaussian spatial power profile.

FIG. 1B is a perspective view of a laser-beam-director system 102 that uses a Cassegrain output optic device.

FIG. 1C is a schematic cross-sectional side view of a laser-beam-director system 103 that uses a Cassegrain output optic device and an input beam that has a flat-topped annular spatial power profile.

FIG. 1D is a schematic cross-sectional side view of a laser-beam-shaper subsystem 104 that provides a beam that has an azimuthally symmetric spatial profile such as a Super-Gaussian.

FIG. 1E is a schematic cross-sectional side view of a laser-beam director system 105 that uses a Cassegrain output optic device and an input beam that has an annular spatial power profile 96 that is similar to or identical to a Laguerre-Gaussian optical mode.

FIG. 2A is a schematic cross-sectional side view of a shaped-laser-beam spectral-beam combiner system 201 that provides an input beam for a beam director (e.g., for FIG. 1C or FIG. 1E) that has an annular spatial power profile.

FIG. 2B is a schematic cross-sectional side view of a shaped-laser-beam spectral-beam combiner system 202 that provides an input beam for a beam director (e.g., for FIG. 1C or FIG. 1E) that has an annular spatial power profile.

FIG. 2C is a schematic cross-sectional side view of a shaped-laser-beam spectral-beam combiner system 203 that provides an input beam for a beam director (e.g., for FIG. 1C or FIG. 1E) that has an annular spatial power profile.

FIG. 2D is a schematic cross-sectional side view of another shaped-laser-beam spectral-beam combiner system 204 that provides an input beam (e.g., for FIG. 1C or FIG. 1E) that has an annular spatial power profile.

FIG. 3 is a schematic diagram of a shaped-laser-beam system 301 that uses a phase plate 320 to provide a shaped input beam that has an annular spatial power profile 377.

FIG. 4B is a schematic perspective-view diagram of a shaped-laser-beam system 402 that uses a smooth-spiral phase plate 422 to provide a shaped input beam that has an annular spatial power profile 477.

FIG. 4C is a schematic side-view diagram of a shaped-laser-beam system 402 that uses a smooth-spiral phase plate 422 to provide a shaped input beam that has an annular spatial power profile 477.

FIG. 4D is another schematic side-view diagram (from a viewpoint 90 degrees relative to that of FIG. 4C) of a shapedlaser-beam system 402 that uses a smooth-spiral phase plate 422 to provide a shaped input beam that has an annular spatial power profile 477.

FIG. 4E is a schematic plan view of an optical-fiber-array assembly 405.

FIG. 4F is a schematic plan view of an optical-fiber-array assembly 406.

FIG. 5A is a schematic plan view of an optical-fiber-array assembly 501.

FIG. 6A is a schematic perspective view of an optical-fiber-array assembly 601.

FIG. 6B is a schematic plan view of optical-fiber-array assembly 601.

FIG. 6C is a schematic plan view of optical-fiber-array assembly 603.

FIG. 6D is a schematic input-end (elevational) view of optical-fiber-array assembly 604 having a plurality of fibers 630 are fused in a two-dimensional array to the input face 611 of base plate 610 or 620.

FIG. 7A is a schematic diagram of amplitudes of a plurality of beams 711 (six beams) from shaped-laser-beam system 604 that uses a plurality of Gaussian emitters to provide a shaped input beam that has an annular spatial power profile 710.

FIG. 7B is a schematic plan-view diagram of amplitudes of a plurality of (e.g., in this case, six) beams 711 from shaped-laser-beam system 604.

FIG. 7C is a schematic diagram of amplitudes of a plurality of beams 711 (twelve beams) from shaped-laser-beam system 604 that uses a plurality of Gaussian emitters to provide a shaped input beam that has an annular spatial power profile 710.

FIG. 7D is a schematic plan-view diagram of amplitudes of a plurality of (e.g., in this case, six) beams 711 from shaped-laser-beam system 604.

FIG. 8 is a schematic plan-view diagram of an optical unit 801 that is used in some embodiments, for optical unit 113 of FIG. 1C.

FIG. 9A is a diagram of a prior-art fiber 901 having an etched end facet or endcap, used in some embodiments of the present invention.

FIG. 9B is a graph of the output beam cross-sectional intensity from prior-art fiber 901 having an etched end facet or endcap, used in some embodiments of the present invention.

FIG. 10 is a diagram of a fiber with focussing endcap 1001 having an etched end facet or endcap, used in some embodiments of the present invention.

DESCRIPTION OF PREFERRED EMBODIMENTS

Figure 4A:
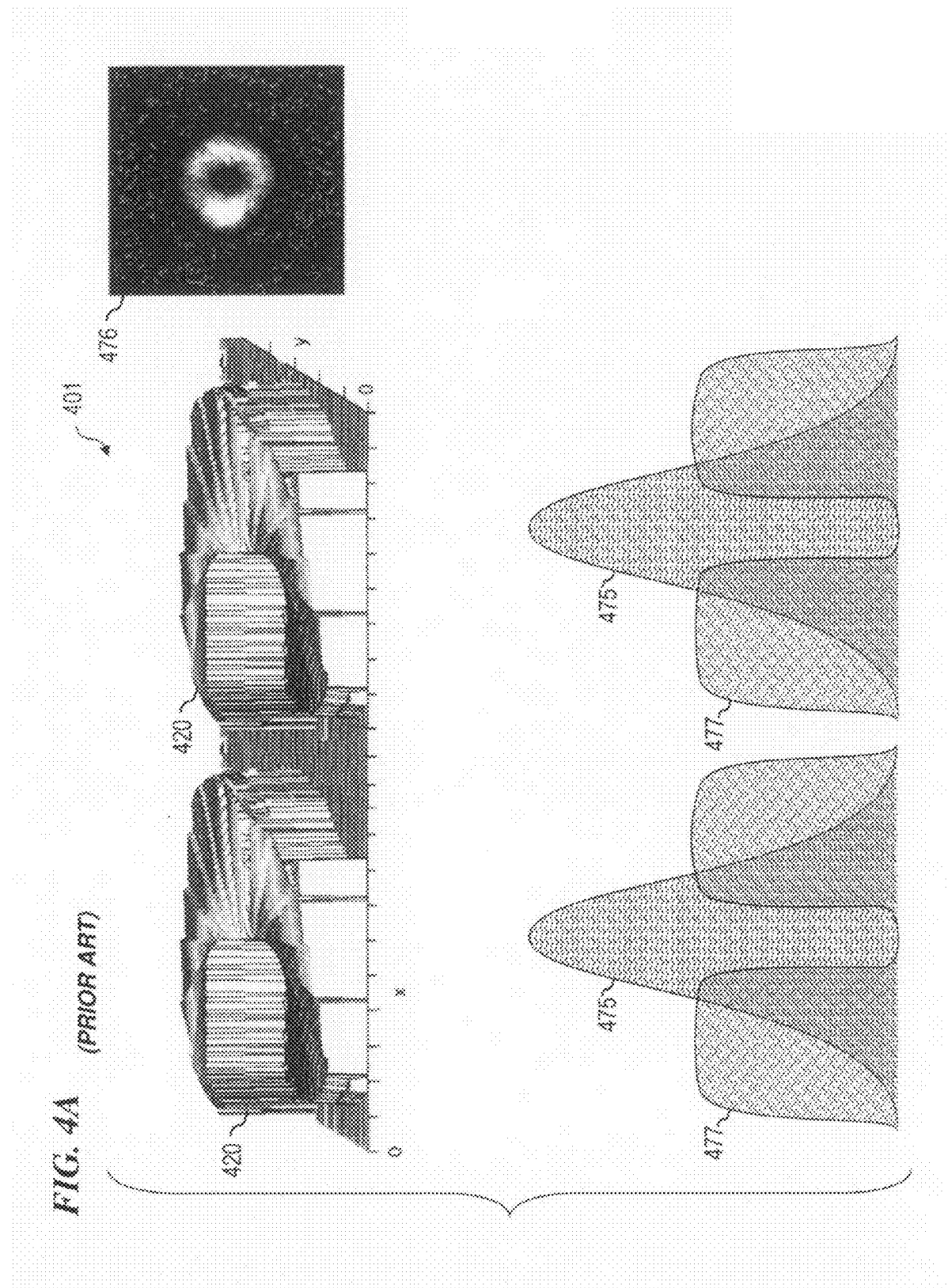
FIG. 4A is a schematic perspective-view diagram of a shaped-laser-beam system 401 that uses a stepped-spiral phase plate 420 to provide a shaped input beam that has an annular spatial power profile 477.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

One problem faced by designers of high-power beam directors is that beam-expanding telescopes used in high-power beam directors typically use a Cassegrain or related design that has a central obscuration. Conventional spectral beam combining (SBC) usually produces a Gaussian spatial beam profile that would suffer significant power loss through such a telescope. For instance, if the Gaussian-shaped spatial-cross-section beam is clipped at the $1/e^2$ diameter, the central portion of the beam contains about 86 percent (~86%) of the power. If that beam goes through a Cassegrain telescope with a four-to-one (4:1) magnification, the central obscuration blocks another ~12% of the beam power. This leaves about 74 percent (~74%) of the SBC beam power transmitted through the telescope and available to propagate to the target.

The present invention provides solutions to shape the SBC laser beam output prior to the beam entering the beam-expanding telescope and minimize losses due to the central obscuration of the beam-expanding telescope. In some embodiments, each one of a plurality of source laser beamlets is shaped to have an annular spatial power cross section before the plurality of source laser beamlets are combined in the spatial beam combiner.

FIG. 1A is a schematic cross-sectional side view of a laser-beam director system 101 that uses a Cassegrain output optic device and an input beam that has a Gaussian spatial power profile. A Cassegrain or related design has a central obscuration associated with the primary convex mirror 160, and a concave secondary mirror 170. Laser source system 151 (in some embodiments, system 151 includes a plurality of fiber lasers and a spectral beam combiner that combines all of the beams from the plurality of lasers) emits an input beam 91 having a Gaussian spatial intensity profile propagates in direction 81, reflects outwardly from mirror 160 toward mirror 170 and the collimated output beam 92 propagates in direction 83, but has a central region 90 that has essentially no light (the optical power is zero in region 90 except for possible incidental light diffracted as the beam passes mirror 160, or any front correction plate (not shown) or any support struts that hold mirror 160 (not shown)). In addition, the outer circumference regions 72 of the input beam (e.g., in some embodiments, the beam area beyond the beam's $1/e^2$ diameter) is clipped because it is outside the outer diameter of mirror 170 after reflecting from mirror 160 and thus misses mirror 170 and/or is blocked by mirror 170 at the outer diameter of aperture 171 (the central opening through mirror 170), so it also has essentially no light (except for incidental diffracted light). In some embodiments, optics 110 (including mirror 160, mirror 170 and their supporting structures) are mounted on a gimbal in order that the beam 92 can be pointed and can track a target object.

In some embodiments, the input beam 91, having a Gaussian-shaped spatial profile, is diverging from a point-like source at location 71 (not necessarily to scale for some embodiments). The mirrors 160 and 170 are shaped to change the diverging beam into a parallel beam. In other embodiments, a spectral-beam combiner (e.g., in some embodiments, as described below for FIG. 2) provides a collimated beam 91, and optics 111 converts the collimated input beam 91 to a collimated output beam 92. Thus, output beam 92 is collimated (parallel rays), has a curved single-phase wave front, and is propagating in direction labeled 82. The outer portions (in the regions labeled 79) of beam 92 have no light (except perhaps a very small amount of diffracted light from the edges of the optics 111) because those portions of input beam 91 are blocked by mirror 170 as that beam passes through opening 171 and/or those portions of the beam are not reflected since they are outside the outer diameter of mirror 170, while the center portion 78 of the output beam also has little or no light because the corresponding portions of the input beam 91 were reflected by mirror 160 back through aperture 171 and/or after reflecting from mirror 160 and then mirror 170, those areas are blocked by mirror 160 at its outer diameter.

In some embodiments, mirror 160 and/or mirror 170 are coated with a diamond or diamond-like crystal form of carbon in order to enhance thermal uniformity across the mirror face and to enhance heat transfer away from their light-facing surfaces, in order to prevent heat-caused distortion of the mirror shape. In some embodiments, any or all of the mirrors described herein have a highly reflective multi-layer dielectric (MLD) coating such as described in U.S. Pat. No. 5,907,436 titled "Multilayer dielectric diffraction gratings" that issued May 25, 1999 to Perry et al., and which is incorporated herein by reference.

FIG. 1B is a perspective-outline view of a laser-beam-director system 102 that uses a Cassegrain-mirror output optic device. In some embodiments, system 102 includes a gimbal mount 122 that allows pointing the output laser beam in any of a plurality of azimuth-elevation (pan-tilt) angles. In some embodiments, the output Cassegrain-mirror is quite large, up to 2-meter diameter or larger. In some various embodiments, laser-beam-director system 102 is land-based (e.g., mounted to a building), land-vehicle based (e.g., mounted to a wheeled (e.g., truck trailer or Humvee®) or tracked (e.g., M1A2 Abrams tank) vehicle), naval-vehicle based (e.g., missile destroyer, submarine, or other warship), aircraft-based, or space-based (e.g., satellite). In some various embodiments, system 102 uses the optical unit 111 of FIG. 1A, optical unit 113 of FIG. 1C, or the other optical units described below.

FIG. 1C is a schematic cross-sectional side view of a laser-beam-director system 103 that uses a Cassegrain output optic device 113 (i.e., a Cassegrain optical projector that outputs a collimated annular beam, in contrast to a substantially similar Cassegrain optical telescope that collects light in the opposite direction) and an input beam 93 that has a substantially flat-topped annular spatial intensity or power profile. In some embodiments, beam 93 is a circularly symmetric (in a plane perpendicular to the direction of light propagation) annular beam. In some embodiments, the input beam optics in laser source 153 re-form the spatial profile of the combined input beams into an annular beam 93 such that optical power is moved (as opposed to being substantially blocked) from the center of the beam(s) to an annular-ring shaped beam 93 having a cross-sectional intensity or power profile that has little or no power in the center of the beam (the portion of the beam that would be blocked by the mirror 163 after reflection from mirror 173, and/or lost after reflection from mirror 163 by propagating back through the hole in mirror 173 has been moved outward in diameter to fill the annulus), and wherein the beam spatial profile has little or no power beyond the outer diameter of mirror 173 after reflecting from mirror 163. In some embodiments, an input beam 93 having an annular-ring-shaped flat-top beam-intensity profile propagates in direction 83, reflects outwardly from mirror 163 toward mirror 173 and the collimated output beam 94 propagates in direction 84, but has a central region 80 that again has essentially no light (the optical power is zero in region 80 as it leaves the optics of output optic device 113 except for possible incidental light diffracted as the beam passes mirror 163, or any front correction plate (not shown) or any support struts that hold mirror 163 (not shown)). In addition, the light from the outer circumference regions 74 of the input beam have been moved inward (e.g., in some embodiments, the beam area beyond the beam's $1/e^2$ diameter is moved inward into the annulus) so that less power is clipped and lost (less light is outside the outer diameter of mirror 173 after reflecting from mirror 163 and thus more light hits the outer diameter of mirror 173) and/or less light is blocked by mirror 173 at the outer diameter of aperture 171 (the central opening through mirror 173), so less power is lost at the inner diameter of beam 94 and less light is lost at the outer diameter of beam 94.

In some embodiments, the input beam 93 is diverging from a virtual point-like source 153 at location 73 (not necessarily to scale for some embodiments). For example, in such embodiments, the input beams impinging on the SBC mirror 240 of FIG. 2A are diverging, and thus its annular output beam 74 would be diverging and would be used as input beam 93 into the Cassegrain projector mirror 113. The mirrors 163 and 173 are shaped to change the diverging beam 93 into a parallel beam 94. In other embodiments, a spectral-beam combiner (e.g., in some embodiments, as described below for FIG. 2) provides a collimated beam 93 (i.e., wherein beam 93 is a collimated beam), and optics 113 converts the collimated input beam 93 to a larger-diameter collimated output beam 94. Thus, output beam 94 is collimated (parallel rays), has a substantially flat single-phase wave front, and is propagating in direction labeled 82. The outer portions (in the regions labeled 89) of beam 94 have no light (except perhaps a very small amount of diffracted light from the edges of the optics 113) because those portions of input beam 91 are blocked by mirror 173 as that beam passes through opening 171 and/or those portions of the beam are not reflected since they are outside the outer diameter of mirror 173, while the center portion 88 of the output beam also has little or no light because light of the corresponding portions of the input beam 93 were moved by the optics of source 153 into the annulus of beam 93 so less light is lost to blockage by optics 113 and/or by reflecting from mirror 163 back through aperture 171.

In some embodiments, mirror 173 is substantially identical to mirror 170, while in other embodiments, mirror 173 has a relatively thin shell and is air-cooled on front and back, or has a hollow core 175 (as shown in FIG. 1C) having one or more enclosed inner voids through which a liquid coolant is circulated in order to prevent heat-caused distortion of the mirror shape. Also, in some embodiments, mirror 163 is substantially identical to mirror 160, while in other embodiments, mirror 163 has a relatively thin shell and is air-cooled on both sides—front and back, or has a hollow core 165 through which a liquid coolant is circulated in order to prevent heat-caused distortion of the mirror shape. In some embodiments, mirror 163 and/or mirror 173 are coated with a diamond or diamond-like crystal form of carbon in order to enhance heat transfer away from their light-facing surfaces in order to prevent heat-caused distortion of the mirror shape. In some embodiments, mirror 163 and/or mirror 173 are also further, or alternatively, coated with a multilayer dielectric layer to enhance reflectivity at the wavelengths of beam 93.

FIG. 1D is a schematic cross-sectional side view of a laser-beam-shaper subsystem 104 that provides an input beam that has a Laguerre-Gaussian annular spatial power profile. In some embodiments, input phase plate 181 and input phase plate 182 are used to form an intermediate beam profile 96 (e.g., used in system 105 of FIG. 1E or in place of beam 93 in system 103 of FIG. 1C) shown in the perspective view of intensity graph 124 or the cross-section graph 125 of beam intensity next to the perspective view graph of intensity 124. In some embodiments, the phase plates 181 and 182 are formed on opposite surfaces of a single substrate or on single faces of two separated substrates (one of which, in some embodiments, can be or is the output surface of a fiber tip) and are composed of $CaF_2$ (or other suitable material that transmits light of the wavelengths used by the SBC laser beam) having thicknesses of about 0 to 10 micrometers in a radial pattern having cross-sections as shown in graph 183 (for phase plate 181) and graph 184 (for phase plate 182). In some embodiments, such an arrangement changes a Gaussian beam cross-sectional spatial profile shape 185 into a flat-top beam with cross-sectional spatial profile 186. In some embodiments, rather than using a phase plate 182 for the phase plate 2 (which could produce a beam shape such as shown in graph 187), another phase plate 181 is used instead to provide a flat-topped annular beam such as beam 93 depicted in FIG. 1C. In some embodiments, annularizing laser-beam-shaper subsystem 104 is uses as laser source 153 in FIG. 1C or laser source 155 in FIG. 1E to provide an annular beam into Cassegrain output optics.

FIG. 1E is a schematic cross-sectional side view of a laser-beam director system 105 that uses a Cassegrain output optic device and an input beam that has a Laguerre-Gaussian annular spatial power profile. In some embodiments, input beam 96 combines a plurality of beams of different wavelengths to an annular-ring shaped combined beam 96 having a cross-sectional intensity or power profile that has little or no power in the center of the beam (the portion of the beam that would be blocked by the mirror 166 after reflection from mirror 176, and/or lost after reflection from mirror 166 by propagating back through the hole in mirror 176 has been moved outward in diameter to fill the annulus), and wherein the beam spatial profile has little or no power beyond the outer diameter of mirror 176 after reflecting from mirror 166. In some embodiments, mirror 176 is substantially identical to mirror 170 of FIG. 1A, while in other embodiments, mirror 176 has a relatively thin shell (as shown for mirror 173 of FIG. 1C) and with a hollow core 175 (as also shown in FIG. 1C) having one or more enclosed inner voids through which a liquid coolant is circulated in order to prevent heat-caused distortion of the mirror shape. Also, in some embodiments, mirror 166 is substantially identical to mirror 160 of FIG. 1A, while in other embodiments, mirror 166 has a relatively thin shell and a hollow core 165, like mirror 163 of FIG. 1C, through which a liquid coolant is circulated in order to prevent heat-caused distortion of the mirror shape. In some embodiments, mirror 166 and/or mirror 176 are coated with a diamond or diamond-like crystal form of carbon in order to enhance heat transfer away from their light-facing surfaces in order to prevent heat-caused distortion of the mirror shape.

FIG. 2A is a schematic cross-sectional side view of a shaped-laser-beam spectral-beam combiner system 201 that provides an input beam 74 (e.g., input to systems 103 of FIG. 1C or system 105 of FIG. 1E described above) that has an annular spatial power profile. In some embodiments, a plurality of optical fibers 211, 212, . . . 213 deliver light from each respective one of a plurality of fiber lasers each having a slightly different wavelength, which are directed and shaped to collimated intersecting beams by transform mirror 230 to intersect, each at a slightly different angle, to multi-layer dielectric (MLD) grating 240, which combines all the beams into a single collimated beam 74. In some embodiments, each of the plurality of input fibers 211, 212, . . . 213 is connected to a fiber termination unit 221 such as a ferrule having a lens (or other focusing element, such as one or more of (i.e., a single element or a combination of two or more elements selected from the group consisting of) a conical output surface (an axicon), a graded-index (GRIN) fiber element, hologram, or curved reflective surface, similar to those such as described in US Patent Publications 2011/0091155 (which issued as U.S. Pat. No. 8,755,649 on Jun. 17, 2014), 2011/0122895 or 2011/0249320 (which issued as U.S. Pat. No. 8,830,568 on Sep. 9, 2014), or U.S. Pat. Nos. 8,411,712 or 8,503,840, which are all incorporated herein by reference) that shapes and/or focuses the light from the plurality of input fibers 211, 212, . . . 213 into an annular expanding beam 76 (shown in cross section in FIG. 2A) toward transform mirror 230, which forms each beam into a collimated annular beam that propagates in free space to beam combiner grating 240. In some embodiments, the amplified optical-fiber-output beams 75 each have a wavelength (also called a channel) that is different from the wavelengths of the others of the beams 75, and each beam 75 is emitted from a respective one of a plurality of fiber terminators 221 arranged in a row. In some embodiments, each of the fiber terminators 221 includes an endcap having a focussing element (such as a lens, or short piece of graded-index (GRIN) fiber, or curved mirror) to emit a respective diverging beam 75 (that is optionally additionally shaped by micro-optics array 221 configured to provide a controlled-beam-divergence annular shape that is matched to be collimated by mirror 230) that is then focussed into a respective collimated annular beam 77 by mirror 230. Each collimated annular beam 77 is oriented at a different angle relative to one another, and are positioned such that the distal end of each collimated beam 77 impinges on the same area (an oblong annular area) of diffractive grating 240, but each at a different angle that is determined such that each different wavelength will diffract into a single output beam 74 that is the spectral-beam combination of all the wavelengths of amplified beams 75.

In some embodiments, transform mirror 230 is or includes an astigmatic focusing element configured to reshape the intermediate beams 77 such that a height-to-width ratio of the output beam 73 is substantially one.

In some embodiments, optical-fiber-array assembly 220 is substantially similar to any one of the optical-fiber-array assemblies of U.S. Pat. No. 8,503,840 except that optical-fiber-array assembly 220 includes a plurality of lenslets (or other optical elements such as curved or conical refractive (e.g., biconvex, plano-convex, positive meniscus, negative meniscus, plano-concave, biconcave, or compound lenses) or reflective surfaces (e.g., curved mirrors that reflect and focus the output beams to annular intensity profiles, and terminators 221 optionally include free-space beam expanders, coreless-fiber beam expanders, GRIN lenses (graded-index fiber lenses), holographic, diffractive, or grating structures, or other optical elements) configured to shape (e.g., focus, collimate, diverge, or the like) individual output beams of the composite output beams 76 of optical-fiber-array assembly 220 to each have annular intensity shapes that are each collimated and each directed to output grating 240 at their own respective different angles (the different angles of each respective collimated beam 77 and the different wavelengths of each respective collimated beam 77 thus being spectral-beam combined by grating 240 into a single collimated annular combined beam 74). In some embodiments, the output surface of each fiber terminator 221 is shaped (e.g., in some embodiments, using a cone-shaped output surface) to generate an annulus-shaped diverging beam 75, which then goes through a beam-shaping optic 222 (e.g., in some embodiments, having a conical input and/or output surface that further shapes and directs each one of the respective beams 76 into a slightly diverging (almost collimated) beam that enlarges the diameters of the annular beams so they each intersect transform mirror 230 each centered at a small lateral displacement from the next along a line across mirror 230. In some embodiments, transform mirror 230 then collimates each beam and directs each beam at a slightly different angle such that all the beams intersect to an annular-shaped area of MLD grating 240, which diffracts each beam at the different appropriate angles such that all the laser beams are combined into a single annular-shaped intermediate beam 74. In some embodiments, this beam 74 is then used as the input beam 91 of FIG. 1A, input beam 93 of FIG. 1C, or input beam 95 of FIG. 1E. By acting on the individual beams 75 out of each fiber tip 221 before the diverging beams overlap, some embodiments of the present invention, using micro-optic array 222, manipulate the beam profile into the desired annular shape. In some embodiments, annularizing laser-beam-shaper and SBC subsystem 201 is uses as laser source 153 in FIG. 1C or laser source 155 in FIG. 1E to provide an annular beam into Cassegrain output optics.

FIG. 2B is a schematic cross-sectional side view of a shaped-laser-beam spectral-beam combiner system 202 that provides an input beam 74 (e.g., input to systems 103 of FIG. 1C or system 105 of FIG. 1E described above) that has an annular spatial power profile. In some embodiments, a plurality of optical fibers 211, 212, . . . 213 deliver light from each respective one of a plurality of fiber lasers each having a slightly different wavelength into annularizing assembly 210 (in some embodiments, assembly 210 includes a plurality of fiber endcaps 221 and a plurality of micro-arrayed optical elements 222 that together generate the plurality of annular beams 76 that have a controlled divergence such that, which are directed and shaped to collimated (i.e., beams each of which has parallel rays) intersecting beams (the plurality of individually parallel annular beams are each propagating at a slightly different angle towards one another) by transform mirror 230 to intersect, each at a slightly different angle, to an oval-shaped area on multi-layer dielectric (MLD) grating 240, which combines all the beams into a single collimated annular beam 74. In some embodiments, the collimated annular beams 77 are configured to strike grating 240 at near their Littrow angle for, e.g., the beam having the central wavelength of the plurality of wavelengths. In some embodiments, those beams having wavelengths longer than the central wavelength will hit the grating 240 on one side of the Littrow angle and those beams having wavelengths shorter than the central wavelength will hit the grating 240 on the other side of the Littrow angle. In some embodiments, annularizing laser-beam-shaper and SBC subsystem 202 is uses as laser source 153 in FIG. 1C or laser source 155 in FIG. 1E to provide an annular beam into Cassegrain output optics.

FIG. 2C is a simplified schematic cross-sectional side view of a shaped-laser-beam spectral-beam combiner system 203 that provides an input beam 74 (e.g., input to systems 103 of FIG. 1C or system 105 of FIG. 1E described above) that has an annular spatial power profile. In some embodiments, a plurality of optical fibers 211, 212, . . . 213 deliver light from each respective one of a plurality of fiber lasers each having a slightly different wavelength, which are directed and shaped to collimated intersecting beams by transform mirror 230 to intersect, each at a slightly different angle, to multi-layer dielectric (MLD) grating 240, which combines all the beams into a single collimated beam 74, which is directed into the Cassegrain output telescope. FIG. 2C has fewer beams than FIG. 2B and is shortened in the left-right direction to show more detail. In some embodiments, each of the beams 76 has a cross-section intensity profile (a plane along cut line 3-376 but in a direction perpendicular to the plane of FIG. 2C) such as graph 377 of FIG. 3, or 125 of FIG. 1D or 93 of FIG. 1C. Cut line plane 2E shown in FIG. 3 shows the direction of cross-sectional intensity graph 377. In some embodiments, annularizing laser-beam-shaper and SBC subsystem 203 is used as laser source 153 in FIG. 1C or laser source 155 in FIG. 1E to provide an annular beam into Cassegrain output optics.

In some embodiments, an astigmatic beam-shaping element (a lens or other optic where rays that propagate in two perpendicular planes through the lens have different foci) is provided for each of a plurality of the fiber beamlets (e.g., 75 or 76 or 77 of FIG. 2C). In some embodiments, the astigmatic beam-shaping element is an astigmatic focussing lens. In some embodiments, the astigmatic beam-shaping element is merged into each conical element 222 (i.e., wherein one face of each element 222 has a cross-section in a direction perpendicular to the direction of laser-light propagation that is a non-circular oval). In some embodiments, the astigmatic beam-shaping element is merged into each end-facet of fiber terminations 221 (i.e., wherein the exit face of each element 221 has a cross-section in a direction perpendicular to the direction of propagation that is a non-circular oval). In some embodiments, mirror 230 performs the astigmatic beam-shaping (e.g., wherein the face of mirror 320 has a cross-section in a direction perpendicular to the direction of propagation that is a non-circular oval). In some embodiments, a holographic or diffractive surface is provided on element 221, 222, and/or 230 to provide the astigmatic beam-shaping.

In some embodiments of all the configurations of the present invention, the output grating 240 is a blazed grating (wherein the grating lines have a triangular (sawtooth) shaped cross section, with the faces of the grooves tilted at the so-called blaze angle with respect to the general surface of the grating, and the grating is used in the so-called Littrow configuration for a central one of the plurality of wavelengths that are spectral-beam combined. The Littrow configuration is a special geometry in which diffraction angle and incidence angle are identical. For a reflection grating, this means that the diffracted beam is back-reflected into the direction of the incident beam. In some embodiments, the blaze angle of grating 240 is chosen to maximize diffractive efficiency at the central one of the plurality of wavelengths.

FIG. 2D is a schematic cross-sectional side view of another shaped-laser-beam spectral-beam combiner system 204 that provides an input beam (e.g., for FIG. 1C or FIG. 1E) that has an annular spatial power profile. In some embodiments, shaped-laser-beam spectral-beam combiner system 204 is similar to system 203 of FIG. 2C, except that the plurality of axicons 222 of system 203 are optionally omitted from system 204, and instead of or in addition to the plurality of axicons 222, a single output axicon 222A is used to collimate the output beam 74, which exits to the right in this figure with an annular cross-sectional intensity (e.g., such as annular intensity shape shown in cross-sectional view 93 of FIG. 1C; or annular intensity shape shown in perspective view 124 and cross-sectional view 125 of FIG. 1D; or perspective view 376, cross-sectional view 377 and end-on plan view 378 of FIG. 3). In some embodiments, output beam 74 of FIG. 2D is used as input beam 93 travelling in direction 83 into Cassegrain optics 113 (i.e., in some embodiments, annularizing laser-beam-shaper and SBC subsystem 201 is uses as laser source 153 in FIG. 1C or laser source 155 in FIG. 1E to provide an annular beam into Cassegrain output optics).

FIG. 3 is a schematic diagram of a shaped-laser-beam system 301 that provides an input beam that has an annular spatial power profile (the cross-section profile graph 375 shows one such profile). In some embodiments, a Gaussian input beam, shown as a perspective shape 374 and cross-sectional shape of graph 375, is passed through a designed phase plate 320 that spatially transforms substantially all of the input energy of Gaussian beam 374 into a flat-topped annular beam shape shown in perspective as 376 and in cross-sectional shape of graph 377. In some embodiments, this beam having cross-sectional intensity profile of graph 377 is then used as the input beam 91 of FIG. 1A, input beam 93 of FIG. 1C, or input beam 95 of FIG. 1E.

FIG. 4A is a schematic perspective-view diagram of a shaped-laser-beam system 401 that uses a plurality of stepped spiral phase plate areas 420 to provide a plurality of shaped beams, each of which has an annular spatial power profile 477. In some embodiments, a plurality of stepped spiral phase plate areas 420 are assembled from initially separate pieces placed one next to another, while in other embodiments, a plurality of stepped spiral phase plate areas 420 are formed as adjacent surface formations on a single substrate (e.g., in some embodiments, using photolithography, ion milling, or the like, to simultaneously form the plurality of stepped spiral phase plate areas 420, which can allow precise registration of the plurality of stepped spiral phase plate areas 420 relative to one another).

FIG. 4B is a schematic perspective-view diagram of a shaped-laser-beam system 402 that uses a smoothed spiral phase plate area 422 to provide a shaped input beam that has an annular spatial power profile 477. In some embodiments, each smoothed spiral phase plate area 422 is similar to a corresponding stepped spiral phase plate area 420 described above, but with a smooth continuous spiral ramp rather than steps, which may eliminate any wavelength sensitivity that might otherwise result from a stepped structure. In some embodiments, a plurality of smoothed spiral phase plate areas 422 are assembled from initially separate pieces placed one next to another, while in other embodiments, a plurality of smoothed spiral phase plate areas 422 are formed as adjacent surface formations on a single substrate (e.g., in some embodiments, using photolithography, ion milling, or the like, to simultaneously form the plurality of smoothed spiral phase plate areas 422, which can allow precise registration of the plurality of smoothed spiral phase plate areas 422 relative to one another).

FIG. 4C is a schematic side-view diagram of a shaped-laser-beam system 402 that uses a smoothed spiral phase plate 422 to provide a shaped input beam that has an annular spatial power profile 477.

FIG. 4D is another schematic side-view diagram (from a viewpoint Y 90 degrees relative to that of FIG. 4C) of a shaped-laser-beam system 402 that uses a smoothed spiral phase plate 422 to provide a shaped input beam that has an annular spatial power profile 477.

FIG. 4E is a schematic plan view of an optical-fiber-array assembly 405. In some embodiments, assembly 405 is used in place of annularizing optics 210 in SBC system 202 of FIG. 2B. In some embodiments, the present invention includes a plurality of optic fibers 430 butt-welded to a transparent base plate 410. In some embodiments, each one of the plurality of optical fibers 430 is attached to a first input surface 411 of base plate 410 (as described in FIG. 3D of U.S. Pat. No. 8,503,840 to Hu et al., which is assigned to the owner of the present application, and which is incorporated herein by reference). In some embodiments, base plate 410 includes a top major face 416 (e.g., in some embodiments, perpendicular to input face 411). In some other embodiments, fibers 430 are glued to first surface 411. In some other embodiments, fibers 430 are fused, soldered, or otherwise attached to first surface 411. In some embodiments, fibers 430 are attached to first surface 411 by laser welding, butt welding, soldering, or the like. In some embodiments, optical signals transmitted through the plurality 435 of optical fibers 430 are transmitted into base plate 410 at first surface 411, transmitted through base plate 410, and then emitted as a composite output beam 477 (which, in some embodiments, includes a plurality of annular diverging annular output beams 465) from base plate 410 at a second surface 412 of base plate 410. In some embodiments, second surface 412 is flat except for spiral phase plate areas 415 (which, in some embodiments, are stepped spiral phase plate areas 401 as shown in FIG. 4A or in other embodiments, smoothed spiral phase plate areas 402 as shown in FIG. 4B). In some embodiments, an anti-reflective (AR)-coating is applied to second surface 412 and/or spiral phase plate areas 415 to improve light transmission through base plate 410 (in some such embodiments, first surface 411 is not AR-coated, since fusing the fibers 430 to the plate 410 eliminates index-of-refraction interfaces).

In some embodiments, optical-fiber-array assembly 405 is substantially similar to shaped-laser-beam system 401 of FIG. 4A or 402 of FIG. 4B, except that optical-fiber-array assembly 405 includes a plurality 430 of optical fibers 430.1-430.n that are butt welded or otherwise affixed to entry surface 411 of transparent base plate 410. In some embodiments, system 405 includes a plurality of (two or more) optical fibers 430.1-403.n that are fused to base plate 410, which includes annularizing optics 415, and one or more assemblies 405 are used in place of annularizing optics 220 of FIG. 2A or annularizing optics 210 of FIG. 2B. System 405 receives a plurality of regular Gaussian-spatial-shaped laser beams 431, one from the end of the core of each optical fiber 430, into transparent base plate 410, where the beams expand (diverge) in the coreless transparent base plate 416, and are reshaped to a plurality of annular beams 465 (by each respective phase plate area 415 (e.g., a stepped phase plate such as 420 of FIG. 4A or a smooth phase plate such as 422 of FIG. 4B) that continue to diverge and propagate in direction 477 (in a manner such as shown and described in FIG. 2B in place of beams 76), such that the beams strike a transform mirror 230 that changes the beams from diverging annular beams 76 into collimated annular beams that then intersect output grating 240. In other embodiments of the invention similar to assembly 405, the phase plate areas 415 are replaced by conical-shaped optical members 416 as shown in FIG. 4F (axicons, or micro-axicons), or in other embodiments, by holographic or grating members 417 as shown in FIG. 4G1. In some embodiments, a plurality of optical-fiber-array assemblies 405 are used in place of annularizing optics 220 of FIG. 2A or annularizing optics 210 of FIG. 2B, and in some such embodiments, some or all of the base plates 410 have only a single input fiber 430 fused to their input face 411 and a single annularizing phase plate 415 on the output face 412.

In some embodiments, base plate 410 is hollow, having a relatively thin wall along input face 411 and a relatively thin wall along output face 412, and a hollow cavity space therebetween. In some embodiments, the hollow cavity has anti-reflection coatings on the inner faces of the walls along input face 411 and output face 412, and the hollow cavity can provide a beam-expansion space that absorbs less laser light than would a completely solid glass base plate 410. In some embodiments, the hollow cavity has annularizing and/or focussing elements on the inner faces of the walls along input face 411 and/or output face 412 to shape the beams inside the hollow base plate 410 to provide the desired annular output beams 460.

FIG. 4F is a schematic plan view of an optical-fiber-array assembly 406. In some embodiments, optical-fiber-array assembly 406 is substantially similar to shaped-laser-beam system 405 of FIG. 4E, but having a plurality of conical output optics 416 (axicons, or micro-axicons) as shown in FIG. 4F rather than having a plurality of spiral phase plate areas 415 on its output side 412 (e.g., such as shown in FIG. 4E) or holographic or grating shaping areas 417 (such as shown in FIG. 4G)). In some embodiments, optical-fiber-array assembly 406 includes a plurality of lenslets (e.g., in some embodiments, a GRIN lens-section 419 is fused at one of each of the GRIN's ends to the ends of optical fibers 430, with the GRIN's other ends fused to the input face 411 of base plate 410 (as described in FIG. 3C2 of U.S. Pat. No. 8,503,840 to Hu et al., which is assigned to the owner of the present application, and which is incorporated herein by reference). In some embodiments, one or more optical-fiber-array assemblies 406 are used in place of annularizing optics 220 of FIG. 2A or annularizing optics 210 of FIG. 2B, and in some such embodiments, some or all of the base plates 410 have only a single input fiber 430 and GRIN lens 419 fused to their input face 411 and a single annularizing axicon 416 on the output face 412. In some embodiments, the GRIN lens(es) 419 are fused to the output face 412 between base plate 410 and the conical axicon(s) 416. In some embodiments, some or all of the conical axicon(s) 416 are replaced by phase plates 415 (as described for FIG. 4E) and/or by holographic annularizing optics 517 as described below for FIG. 5A.

FIG. 5A is a schematic plan view of an optical-fiber-array assembly 501. In some embodiments, optical-fiber-array assembly 501 is substantially similar to shaped-laser-beam system 406 of FIG. 4F on its input side (having a plurality of optical fibers 430 each fused to a GRIN lens which is in turn fused to base plate 510), however, in some embodiments, the base plate 510 of optical-fiber-array assembly 501 includes a concave-shaped output face 512 shaped and configured to cause each beam to exit face 512 propagating at a different intersecting angle such that the beams 560 propagate generally in intersecting direction 577. In some embodiments, each holographic grating element 517 is generated by calculating a microlens-array surface (e.g., such as described in U.S. Pat. No. 4,813,762 to Leger et al. titled "Coherent beam combining of lasers using microlenses and diffractive coupling", which is incorporated herein by reference), and/or calculating (e.g., in a manner similar to that described in U.S. Pat. No. 5,454,004 to Leger titled "Phase grating and mode-selecting mirror for a laser", which is incorporated herein by reference). Similar to U.S. Pat. No. 5,454,004, some embodiments of the present invention use a method for making a custom diffractive surface that includes: (a) choosing a specified annular beam mode profile $a_t(x,y)$ that will suit need of a designer, (b) calculating the mode profile $b(x',y')$ which is a value of the specified $a_t(x,y)$ that is propagated from the output surface of the diffractive area and (c) calculating grating transmittance $t(x',y')$ which provides a phase conjugate of $b(x',y')$). In some embodiments, output face 512 has a plurality of holographic or grating beam-shaping areas 517 that shape the output beams into annular beams 560. In some embodiments, each annular beam 560 individually diverges. In some embodiments, other optical elements are also provided on the output face 512 such as curved refractive (e.g., biconvex, plano-convex, positive meniscus, negative meniscus, plano-concave, biconcave, conical or compound lenses) or reflective surfaces (e.g., curved mirrors that reflect and focus the output beams through the top surface 516, GRIN lenses (graded-index fiber lenses), holographic, diffractive, or grating structures to focus or collimate the beams 560, or other optical elements) 557 configured to shape (e.g., focus, collimate, diverge, or the like) individual output beams of the composite output beam 577 of optical-fiber-array assembly 501. For example, in some embodiments, individual optical signals are transmitted through optical-fiber-array assembly 501 such that the plurality of output beams associated with the individual optical signals are emitted as diverging annular output beams 560 from optical-fiber-array assembly 501. In some embodiments, input-side lenslets 419 are further configured to reduce aberration. In some embodiments, output gratings 517 are formed separately from base plate 510 and then later affixed to second surface 512 of base plate 510 by fusing, butt (or other) welding, gluing or the like. In other embodiments, lenslets 517 are formed as part of base plate 510 (e.g., by e-beam writing of the shapes on a photoresist applied to concave face 512, and then using conventional lithographic etching and applying additional photoresist and aligning of further e-beam writing of subsequent diffractive shapes to provide a stepped diffractive grating as described by Leger in U.S. Pat. No. 5,454,004.

One method for fabricating lenslets usable with the present invention is described in U.S. Pat. No. 7,128,943 (hereinafter, "Djeu"), titled "Methods for fabricating lenses at the end of optical fibers in the far field of the fiber aperture," issued Oct. 31, 2006, and incorporated herein by reference. Djeu describe a microlens affixed in the far field of an optical fiber to spatially transform a beam either entering or exiting the fiber. In a first embodiment, a droplet of photo polymer is placed on the end of an optical fiber and the fiber is spun to create an artificial gravity. The droplet is cured by UV radiation during the spinning. In some embodiments, the method described by Djeu is modified such that lenslets are suitably formed on surface 512 of base plate 510, wherein the lenslets provide the annularizing and the focussing of the beams 560.

In some embodiments, a plurality of lenslets 419 located between the ends of each of a plurality of fibers 430 are formed using very short sections of focussing GRIN fibers fused to the light-output ends of the fibers as described in United States Patent Application Publication 2011/0249321 by Savage-Leuchs et al. titled "Signal and pump mode-field adaptor for double-clad fibers and associated method," which is assigned to the owner of the present application, and is incorporated herein by reference. Patent Publication 2011/0249321 describes optical fibers, wherein the opposite ends of the very short sections of GRIN lenslets 419 are fused or glued to the base plates as described herein, and GRIN lenslets 419 perform a focussing function on the input light going into base plate 510. In some embodiments, very short sections of focussing GRIN fibers (not shown) are fused to the output face 512 of base plate 510, in addition to the diffractive gratings or holograms 517 shown in FIG. 5A, and perform a focussing function on the output light. In some embodiments, the diffraction gratings or holograms 517 also a focussing function on the output light. In some embodiments, the very short sections of input focussing GRIN fibers 419 are omitted and the fibers 430 are fused directly to the input face 511 of base plate 510 (as described for FIG. 4E).

In some embodiments, diffractive gratings or holograms 517 are formed on the ends of fibers 430 by a high-power laser (e.g., in some embodiments, a carbon dioxide ($CO_2$) laser) in a process such as used by OZ Optics, 219 Westbrook Road, Ottawa, Ontario, KOA 1LO, Canada, to form tapered and lensed fibers (www.ozoptics.com/ALLNEW_PDF/DTS0080.pdf).

Figure 5B:
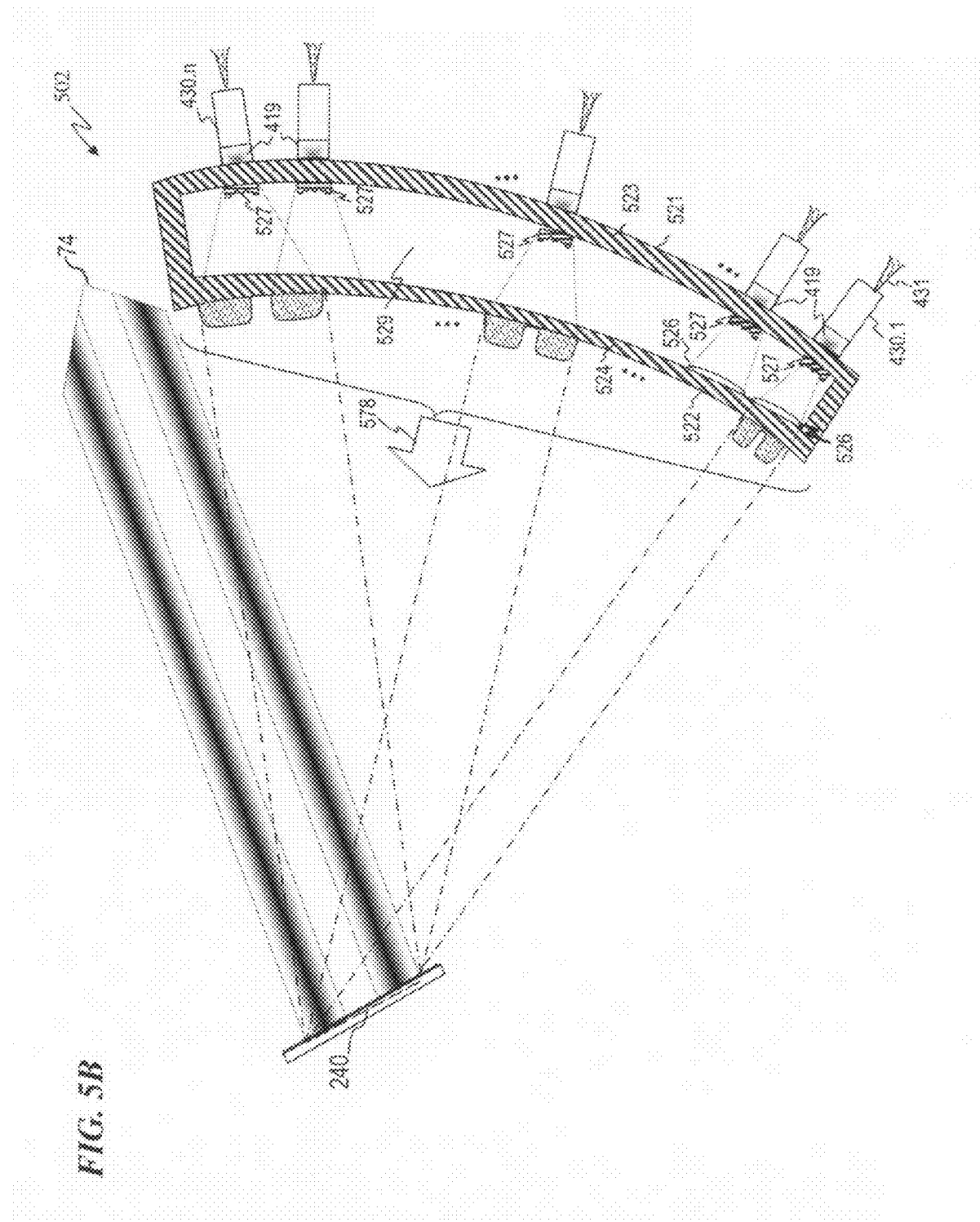
FIG. 5B is a schematic plan view of an optical-fiber-array assembly 502.

FIG. 5B is a schematic plan view of an optical-fiber-array assembly 502. In some embodiments, optical-fiber-array assembly 502 includes a hollow base plate 520 that has an internal cavity 529 that is either filled with air, helium or some other gas, or in other embodiments, has a vacuum. In some embodiments, optical-fiber-array assembly 502 has a relatively thin wall 522 having curved input face 521 on its input side (in some embodiments, having a plurality 430 of optical fibers 430.1-430.n each fused to a GRIN lens 419 which is in turn fused to wall 522 of base plate 520, or in other embodiments, omitting the GRIN lens and having fibers 430 fused to input wall 522 directly), and a relatively thin wall 524 having curved output face 522 on its output side (in some embodiments, having a plurality of focussing elements 526 (shown here as lenslets, but in other embodiments, using diffractive gratings or holographic focussing elements) on the output wall 524 to collimate the output beams 578 each into a collimated annular beam, wherein the annular beams all impinge onto a single annular area on SBC mirror 240). In other embodiments, the output wall 524 itself is curved to climate the diverging annular beams created by the respective annularizing elements 527. In some embodiments, the base plate 510 of optical-fiber-array assembly 501 includes a concave-shaped output face 512 shaped and configured to cause each beam to exit face 512 propagating at a different intersecting angle such that the plurality of beams 560 (i.e., the individual beams 560.1-560.n) propagate generally in intersecting direction 578. The SBC output grating spectrally combines the beams each having a different wavelength and different impingement angle into a single SBC annular output beam 74 that is output through a Cassegrain projector (such as Cassegrain projector optics 111 of FIG. 1A or Cassegrain projector optics 113 of FIG. 1C). Thus, optical-fiber-array assembly 502 combines a plurality of beams, each having a Gaussian shape 431 from delivery fibers 430 into an annular SBC beam 74.

FIG. 6A is a schematic perspective view of an optical-fiber-array assembly 601. In some embodiments, optical-fiber-array assembly 601 includes a hollow base plate 610 and a plurality of optical fibers 630 (e.g., in some embodiments, optical fiber 630.1 through 630.N) that are attached to a first surface 611 of base plate 610. In some embodiments, base plate 610 includes a top major face 616. In some embodiments, optical signals transmitted through the plurality of optical fibers 630 are transmitted into base plate 610 at first surface 611, transmitted through base plate 610, and then emitted as a composite output beam 677 from base plate 610 at a second surface 612 of base plate 610. In some embodiments, base plate 610 includes a hollow plate 660 having an interior space (in some embodiments, the interior space of hollow plate 660 is air-filled, gas-filled or has a vacuum). Hollow cavity 660 allows the optical signals transmitted through the plurality 630 of optical fibers to expand within base plate 610 without having to go through as much material (e.g., glass), which therefore leads to less power absorption. In some embodiments, the plurality of optical fibers 630 include a plurality of hollow-core photonic-bandgap fibers, and in some such embodiments, the plurality of hollow-core fibers 630 are butt-welded to a corresponding plurality of capillary holes (e.g., in some embodiments, capillary holes as described in U.S. Pat. No. 8,503,840 to Hu et al.) through first surface 611 such that the center of an individual fiber 630 lines up with the center of a corresponding capillary hole, such that the capillary holes act as beam-expanding endcaps. In some embodiments, each of the capillary holes terminates at one of the plurality of lenslets 652, which, in some embodiments, are antireflective coated. In some other embodiments, capillary holes 631 connect directly to hollow cavity 660 such that optical signals transmitted through the plurality of optical fibers 630 are transmitted through capillary holes 631 and into hollow cavity 660 without a glass interface. In some embodiments, the output wall having output face 612 has a plurality 650 of conical axicons 416 (see description of FIG. 4F) that reshape the Gaussian input beams into a plurality of annular output beams 677.

FIG. 6B is a schematic plan view of optical-fiber-array assembly 601. In some embodiments, the axicons 416 are replaced by spiral phase plates 415 or diffractive gratings 517 described above. In some embodiments, the plurality of lenslets 626 are omitted and replaced by GRIN lenses fused between the ends of fibers 630 and input wall 621. In other embodiments, the axicons 416 or spiral phase plates 415 or diffractive gratings 517 are located on the inner face of the input wall 622 (in the place of lenslets 626). In some embodiments, the annular output beams 653 are individually diverging or, in other embodiments, converging, due to the focussing elements 626 (and/or 628 shown in FIG. 6C).

FIG. 6C is a schematic plan view of optical-fiber-array assembly 603. In some embodiments, base plate 620 has a plurality of focussing elements 626, 628 on the inner walls of cavity 660 (and/or focussing elements on the outside face(s) of base plate 620 (e.g., GRIN elements 419 between optical fibers 630 and input face 611)). In some embodiments, lenslets 628 (or other focussing elements) are placed on the inside and/or outside of the output wall 622 having the output face 612. In some embodiments, the axicons 416 as shown in FIG. 6A (or phase plates 415 as shown in FIG. 4E or diffractive gratings 517 as shown in FIG. 5A) are located on the outside of the output wall 622. In some embodiments, the axicons 416 (or phase plates 415 or diffractive gratings 517) are instead located on the inside of the input wall 621. In some embodiments, the annular output beams 653 are individually collimated.

FIG. 6D is a schematic input-end (elevational) view of optical-fiber-array assembly 604. In some embodiments, a plurality of fibers 630 are fused in a two-dimensional array to the input face 611 of base plate 610 or 620. In some embodiments, a triangle array 641, square array 642, hexagonal array 643 or other polygon array of groups of fibers 630 is fused around each of a plurality of circular central areas 639 not having an optical fiber. In some embodiments, a plurality of groups each having the same number of fibers (e.g., arrays 643) are used. In other embodiments, a plurality of groups each having different numbers of fibers (e.g., arrays 641, 642, and the two 643 arrays) are used. In some embodiments, both fibers 630 of a respective pair (e.g., the two fibers 630.j, the two fibers 630.m, or the two fibers 630.k) having the same horizontal spacing from an end 619 are configured to be driven by and deliver identical versions of respective laser signals (e.g., having the same wavelength and phase front, such as high-power laser signals driven in a master-oscillator power amplifier (MOPA) system). In some embodiments, all of the fibers of a single group (e.g., both fibers 630.*j*, both fibers 630.*m*, and both fibers 630.*k*) are driven by MOPA laser signals all driven from a single source. In some such embodiments, a plurality of the deliver fibers 630 of each group is attached to and controlled by a fiber stretcher or other such device that will controllably delay some of the laser signals from a single group (e.g., each group 643) such that all of the signals from that group arrive with the same phase in the output beam 74 (see FIG. 1C (input beam 93) which, in some embodiments, comes from output beam 74 of SBC system 202 of FIG. 2B, that uses the output beams from device 601, 603 or 604). In some embodiments, the grouped-fibers configuration described for FIG. 6D is used in either of the systems 601 or 602 of FIG. 6A or 6C, but wherein the annularizing elements are omitted and instead a circular arrangement of Gaussian beams (see FIG. 7A-7D).

FIG. 7A is a schematic perspective-view diagram of amplitudes of a plurality of (e.g., in this case, six) beams 711 from a shaped-laser-beam system 604 that uses a plurality of Gaussian emitters to provide a shaped input beam that has the plurality of Gaussian beams arranged around a low-power central region in somewhat annular spatial power profile 701. In some embodiments, the bottom outer circumference represents the 1/e level of power relative to the maximum power of each beam.

FIG. 7B is a schematic plan-view diagram of amplitudes of a plurality of (e.g., in this case, six) beams 711 from a shaped-laser-beam system 604 that uses a plurality of Gaussian emitters to provide a shaped input beam that has the plurality of Gaussian beams arranged around a low-power central region in somewhat annular spatial power profile 701. In some embodiments, the outer circumference of each circularly symmetric represents the 1/e level of power relative to the maximum power of each beam.

FIG. 7C is a schematic diagram of amplitudes of a plurality of beams 711 (twelve beams) from shaped-laser-beam system 604 that uses a plurality of Gaussian emitters to provide a shaped input beam that has an annular spatial power profile 710.

FIG. 7D is a schematic plan-view diagram of amplitudes of a plurality of (e.g., in this case, six) beams 711 from shaped-laser-beam system 604.

FIG. 8 is a schematic plan-view diagram of an optical unit 801 that is used in some embodiments, for optical unit 113 of FIG. 1C. In some embodiments, each fiber 830 has an endcap 821 that expands the output beam from the fiber and has a conical output facet that forms a respective annular beamlet 75. In some embodiments, a plurality of conical optical members 822 then reforms these into annular beamlets 76 that propagate parallel to one another. In some embodiments, annular beamlets 76 are collimated. In other embodiments, annular beamlets 76 are slightly diverging. In some embodiments, the annular beamlets intersect a transform mirror 230 as shown in FIG. 2A and FIG. 2B, which directs each beam at a different angle towards output grating 240, which forms a single annular output beam by spectral beam combining the various beams of differing wavelengths. In some embodiments, the plurality of optical fibers is arranged in a linear array, and optics 810 include micro-axicon optics that form the parallel annular output beams 76.

FIG. 9A is a diagram of a prior-art fiber 901 having an etched end facet or endcap, used in some embodiments of the present invention. In some embodiments, fiber 901 is as described by Mayel et al. in Photonic Sensors (2011) Vol. 1 No. 2: 187-198, DOI: 10.1007/s13320-011-0028-1. In some embodiments, fiber 901 converts a Gaussian beam profile from the core of the fiber to a flat top beam profile with a uniform intensity distribution. A flat-top beam with intensity variation of approx. 5% and (flat top diameter)-to-(spot diameter) ratio of 67% has been achieved. In some embodiments, this device changes the beam shape from a Gaussian spatial-intensity profile to a donut (annular) spatial-intensity profile shape by moving the observation plane; in some embodiments, a focussing or collimating optical element (e.g., lens) is placed at the observation plane to collimate the annular beam. In some embodiments, this fiber 901 along with a collimating optical element according to the present invention is used to form each of the plurality of annular beams 76 used in assembly 202 of FIG. 2B.

FIG. 9B is a graph of the output beam cross-sectional intensity from prior-art fiber 901 having an etched end facet or endcap, used in some embodiments of the present invention.

FIG. 10 is a diagram of a fiber with focussing endcap 1001 having an etched end facet or endcap, used in some embodiments of the present invention. In some embodiments, optical fiber 1011 includes a tip with an etched recess similar to fiber 901 as described above; however fiber 1011 is fused to an endcap 1012 (in some embodiments, a hollow endcap with a lens 1013 fused at the right-hand end; in other embodiments, a hollow base plate (such as base plate 610 of FIG. 6A, and having a plurality of hollow capillaries (e.g., one per fiber 1011))), which includes focussing or collimating optics to output annular beam 76. In some embodiments, lens 1013 is replaced by an axicon element 1013' (not shown, but similar to element 222A of FIG. 2D described above) with its conical face facing left so that the diverging beam exiting the fiber at the right-hand exit facet (with its conical indent) becomes collimated by axicon element 1013'). In some embodiments, a plurality of such fibers with focussing endcaps or fused to a hollow base plate 610, is used for assembly 210 of FIG. 2B or assembly 220 FIG. 2A.

Figure 11:
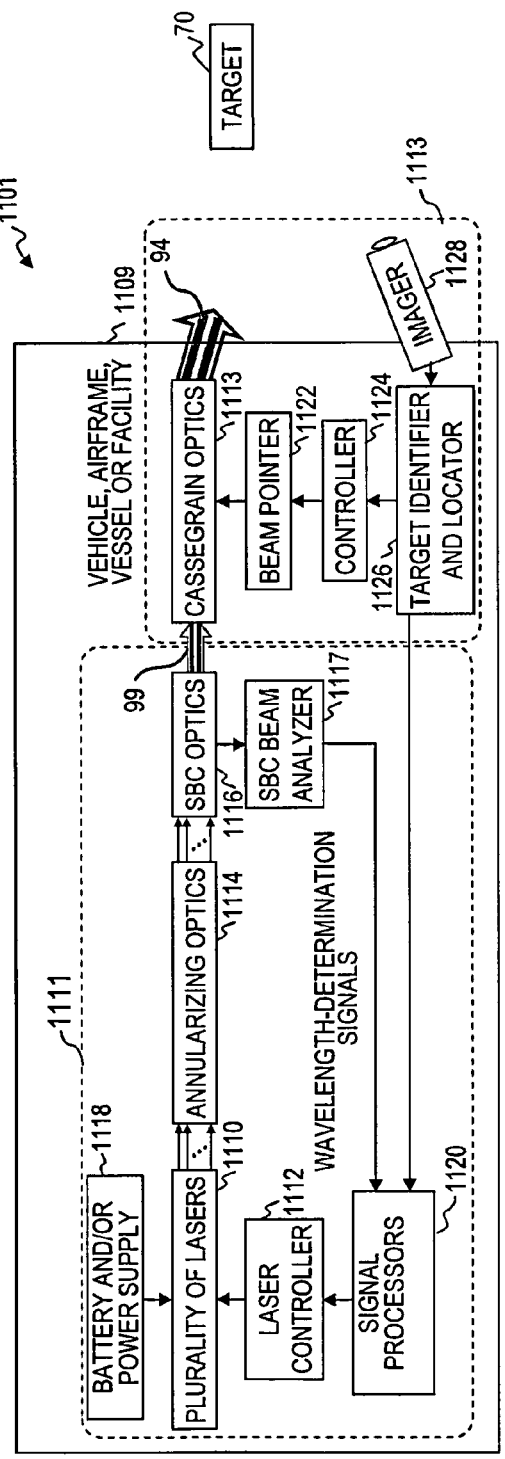
FIG. 11 is a block diagram of a high-power-fiber-laser control system 1101 using one or more of the annularizing fiber-laser systems as described herein.

FIG. 11 is a block diagram of a high-power-fiber-laser system 1101 using one or more of the annularizing fiber-laser systems as described herein. FIG. 11 is a block diagram of a high-power spectral-beam-combining (SBC)-fiber-laser control system in an overall product 1101 (e.g., a vehicle such as a naval vessel as shown here (such as a frigate, destroyer or aircraft carrier), a land vehicle (such as a tank or remotely-operated robotic vehicle), airframe (such as a helicopter or jet airplane), or facility (such as an airport or bunker)) using one or more of the annularizing SBC-fiber-laser systems as described herein. In some embodiments, system 1101 includes the vehicle, airframe, vessel or facility enclosure 1109 and its other contents (e.g., engines and control systems), one or more battery and/or electrical power supplies 1118, a laser controller 1112 that provides the control of wavelength, pulse timing and duration for embodiments using pulse signals (other embodiments use CW (continuous wave) signal beams), output-power control, direction control of the output beam and the like, an imaging calculation microprocessor and/or circuitry 1126 that obtains an image signal from imager 1128 and calculates such data as target location and velocity that is then delivered to laser controller 1112, signal processors 1120 that receive wavelength-determination signals and/or directional-drift signals from the SBC (spectral-beam combiner) module 1117 (with its associated wavelength-, beam-off-axis and beam-off-angle detection sensors and circuitry, as described in U.S. Pat. No. 7,199,924 issued Apr. 3, 2007 to Andrew J. W. Brown et al., titled "Apparatus and method for spectral-beam combining of high-power fiber lasers," which is incorporated herein by reference), and that delivers wavelength-correction control data to laser controller 1112. In some embodiments, laser controller 1112 generates the control and power signals that are based at least in part on forward-tap signals and backward-tap signals (e.g., in some embodiments, as described in U.S. Patent Publication No. US 2011/0091155 of Yilmaz et al., titled "In-Line Forward/Backward Fiber-Optic Signal Analyzer," which is incorporated herein by reference, and which issued as U.S. Pat. No. 8,755,649 on Jun. 17, 2014). In some embodiments, laser controller 1112 generates the control and power signals that are sent to fiber-laser module 1100, which then delivers high-power optical beams at a plurality of different wavelengths to annularizer optics 1114 and SBC 1116, which then combines the laser beams into a single multi-wavelength annular output laser SBC beam 99 (e.g., such as beam 93 of FIG. 1C, beam 96 of FIG. 1E, beam 74 of FIG. 2A, beam 74 of FIG. 2B, beam 74 of FIG. 2C, beam 74 of FIG. 2D, beam 376 of FIG. 3, or beam 74 of FIG. 5B, or other like beams of the present invention) that goes through Cassegrain optics 1113, which collimates and directs the output beam 94 toward target 70 (e.g., a hostile aircraft or spacecraft), according to the control information that was generated based on image information obtained from imager 1126. In some embodiments, high-power-fiber-laser system 1101 includes a laser system 1111 that supplies an annular laser beam to command-and-control targeting output optics and control system 1113, which obtains a target image using imager 1128. The target image is analyzed by target-identifier-and-locater system 1126, and the results go (a) to beam-output controller 1124 that drives the beam-pointer unit 1122, and (b) to signal processors 1120 that drive the laser controller 1112 to generate the laser power when needed. In some embodiments, system 1101 is part of, and used as an element of, a directed-energy (DE) weapon carried by a vehicle 1109 (such as a tank, an aircraft, or a naval vessel 1201 such as illustrated in FIG. 12).

Accordingly, some embodiments of the present invention further include a vehicle 1109; an electrical power supply 1119 mounted to vehicle 1109; a laser controller 1112 mounted to vehicle 1109 and operatively coupled to receive electrical power from electrical power supply 1119 and operably coupled to power and control the plurality of laser sources 1110; a Cassegrain projector 1113 mounted to vehicle 1109 and operatively coupled to receive the first annular spectrally combined beam 99 and configured to form a collimated second annular output beam 94 from the optical energy of the first annular spectrally combined beam 99; and a beam-direction controller (1122, 1124 and 1126) operably coupled to Cassegrain projector 1113 and operable to direct annular output beam 94 in one of a plurality of different possible directions relative to vehicle 1109.

Figure 12:
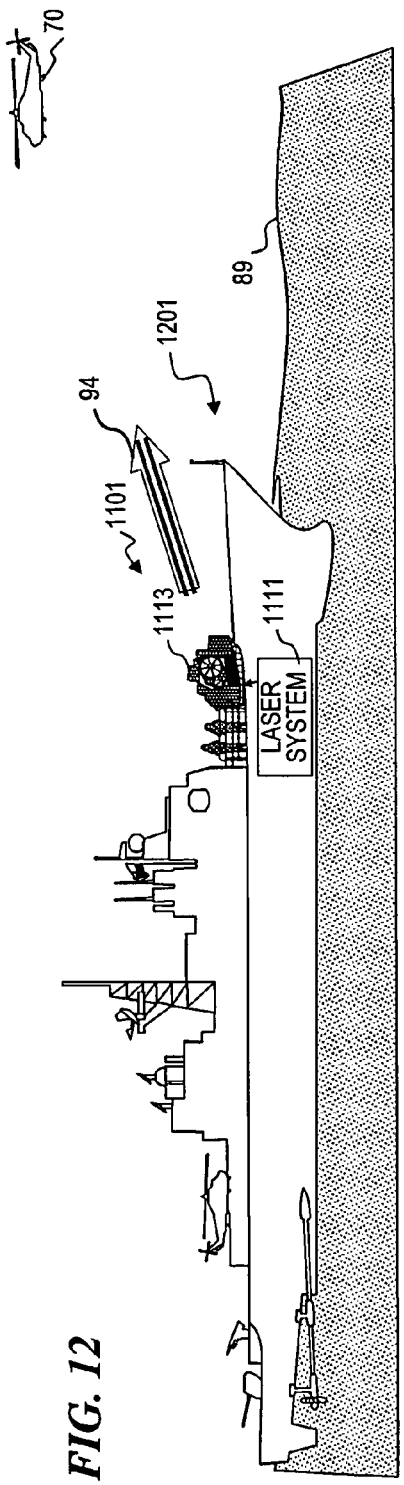
FIG. 12 is a diagram of a high-power-fiber-laser control system 1101 integrated into a naval vessel 1201, and using one or more of the annularizing fiber-laser systems as described herein.

FIG. 12 is a diagram of a high-power-fiber-laser system 1101 integrated into a naval vessel 1201, and using one or more of the annularizing fiber-laser systems as described herein. In some embodiments, high-power-fiber-laser system 1101 includes a laser system 1111 that supplies an annular laser beam to command-and-control targeting output optics and control system 1113.

In some embodiments, the present invention provides a system for combining a plurality of laser beamlets to form a single annular beam using spectral beam combination. This system includes a plurality of laser sources that emit a plurality of beamlets, wherein each one of the plurality of beamlets has a different wavelength; a beam annularizer that includes a plurality of optical units arranged to receive the beamlets, and configured to convert each beamlet into a respective annular beam that has an annular cross-sectional power profile; a beam-intersection transform element configured to point each respective one of the plurality of annular beams in an angular intersection arrangement toward a first location; and a spectral beam combiner at the first location configured to combine the plurality of wavelengths in the plurality of annular beams into a first annular spectrally combined beam.

In some embodiments, the beam-intersection transform element is also configured to collimate each of the intersecting beams.

In some embodiments, the first annular combined beam is a collimated beam. In some such embodiments, the system further includes a Cassegrain projector operatively coupled to receive the first annular combined collimated beam and configured to form a second collimated annular output beam from the optical energy of the first annular combined collimated beam.

In some embodiments of the apparatus, the first annular spectrally combined beam is a diverging annular beam. In some such embodiments, the system further includes a Cassegrain projector operatively coupled to receive the first annular combined diverging beam and configured to form a second collimated annular output beam from the optical energy of the first annular combined diverging beam.

Some embodiments of the apparatus further include a vehicle; an electrical power supply mounted to the vehicle; a laser controller mounted to the vehicle and operatively coupled to receive electrical power from the electrical power supply and operably coupled to power and control the plurality of laser sources; a Cassegrain projector mounted to the vehicle and operatively coupled to receive the first annular spectrally combined beam and configured to form a collimated second annular output beam from the optical energy of the first annular spectrally combined beam; and a beam-direction controller operably coupled to the Cassegrain projector and operable to direct the second annular output beam in one of a plurality of different possible directions relative to the vehicle.

In some embodiments of the system, the plurality of laser sources includes a plurality of optical-fiber lasers. In some embodiments, the plurality of laser sources includes at least about ten (10) laser fibers arranged in a one-dimensional linear array (i.e., where the fiber output laser signals 75 are along a single line, such as shown in FIG. 2C). In some embodiments, the plurality of laser sources includes at least about twenty (20) laser fibers arranged in a two-dimensional array (i.e., where the fiber output laser signals (such as reference 75 of FIG. 2C) are emitted from fibers arranged spaced along two dimensions such as shown by reference numbers 641, 642 or 643 in FIG. 6D). In some embodiments, the plurality of laser sources includes at least about one-hundred (100) laser fibers arranged in a one-dimensional linear array (i.e., where the fiber output laser signals 75 are along a single line, such as shown in FIG. 2C). In some embodiments, the plurality of laser sources includes at least about one-hundred (100) laser fibers arranged in a two-dimensional array (i.e., where the fiber output laser signals 75 are emitted from fibers arranged spaced along two dimensions such as shown in FIG. 6D). As used herein, each one of the plurality of laser sources outputs its laser light in what is called "a channel," the channel having a spectral linewidth that can be expressed as a difference in wavelengths between full-width-half-maximum (FWHM) points in its spectrum, or as the linewidth expressed as the equivalent FWHM difference in frequencies. In some embodiments, each one of the plurality of laser sources has an optical linewidth of no more than about 100 MHz. In some embodiments, each one of the plurality of laser sources has an optical linewidth of no more than about 500 MHz. In some embodiments, each one of the plurality of laser sources has an optical linewidth of no more than about 1 GHz. In some embodiments, each one of the plurality of laser sources has an optical linewidth of about 1 GHz. In some embodiments, each one of the plurality of laser sources has an optical linewidth of about 3 GHz. In some embodiments, each one of the plurality of laser sources has an optical linewidth of no more than about 5 GHz. In some embodiments, each one of the plurality of laser sources has an optical linewidth of about 5 GHz. In some embodiments, each one of the plurality of laser sources has an optical linewidth of no more than about 10 GHz. In some embodiments, each one of the plurality of laser sources has an optical linewidth of about 10 GHz. In some embodiments, each one of the plurality of laser sources has an optical linewidth of no more than about 20 GHz. In some embodiments, each one of the plurality of laser sources has an optical linewidth of about 20 GHz. In some embodiments, each one of the plurality of laser sources has an optical linewidth of no more than about 30 GHz. In some embodiments, each one of the plurality of laser sources has an optical linewidth of about 30 GHz. In some embodiments, each one of the plurality of laser sources has an optical linewidth of no more than about 50 GHz. In some embodiments, each one of the plurality of laser sources has an optical linewidth of about 50 GHz. In some embodiments, each one of the plurality of laser sources has an optical linewidth of no more than about 100 GHz. In some embodiments, each one of the plurality of laser sources has an optical linewidth of about 100 GHz. In some embodiments, systems of the present invention where each channel has a linewidth of about 100 GHz, it is easier to get high power from each fiber laser, but more difficult to combine the channels in the SBC unit (called "good for laser, poor for SBC"); in contrast, in some systems of the present invention where each channel has a linewidth of about 100 MHz, it is harder to obtain very high power (i.e., 10,000 watts or more) from each of the plurality of fiber lasers, but spectral beam combining such narrow linewidths is easier (called "poor for laser, good for SBC"); accordingly, some embodiments use fiber laser sources having linewidths between 1 GHz and 25 GHZ, inclusive. In some embodiments, each channel has an output power of at least 1,000 W. In some embodiments, each channel has an output power of at least 10,000 W. In some embodiments, each channel has an output power of at least 100,000 W. In some embodiments, the second collimated annular output beam has an output power of at least 10,000 W. In some embodiments, the second collimated annular output beam has an output power of at least 100,000 W. In some embodiments, the second collimated annular output beam has an output power of at least 1,000,000 W. In some embodiments, the second collimated annular output beam has an output power of at least 10,000,000 W. In some embodiments, the beam annularizer includes one or more optical elements and an active positioning control subsystem operably connected to one or more of the optical elements to position the beams such that light from all the beams is aligned in the output beam. In some embodiments, the system further includes an astigmatic focusing element configured to reshape the output beam such that a height-to-width ratio of the output beam is substantially one. In some embodiments, the plurality of laser sources includes a plurality of photonic-crystal-fiber (PCF) amplifiers.

In some embodiments, the present invention provides a method for combining a plurality of laser beamlets to form a single annular beam using spectral beam combination. This method includes emitting a plurality of laser beamlets from a plurality of laser sources, wherein each one of the plurality of beamlets has a different wavelength; annularizing each of the plurality of beamlets to convert each beamlet into a respective annular beam each having an annular cross-sectional power profile; pointing each respective one of the plurality of annular beams in a angularly intersecting direction toward a first location; and spectral beam combining the intersecting beams at the first location to combine the light of the plurality of wavelengths in the plurality of annular beams into a first annular spectrally combined beam.

In some embodiments, the first annular combined beam is a collimated beam. In some such embodiments, the method further includes providing a Cassegrain projector; and receiving the first annular combined collimated beam into the Cassegrain projector, and forming, with the Cassegrain projector, a second collimated annular output beam from the optical energy of the first annular combined collimated beam.

In some embodiments, the first annular spectrally combined beam is a diverging annular beam. In some such embodiments, the method further includes providing a Cassegrain projector; and receiving the first annular combined diverging beam into the Cassegrain projector, and forming, with the Cassegrain projector, a second collimated annular output beam from the optical energy of the first annular combined diverging beam.

In some embodiments of the method, the plurality of laser sources includes a plurality of optical-fiber lasers. In some embodiments, the plurality of laser sources includes about one-hundred (100) laser fibers arranged in a one-dimensional linear array. In some embodiments, each one of the plurality of laser sources has an optical linewidth of about 1 nm. In some embodiments, each one of the plurality of laser sources has an optical linewidth of between about 1 GHz and about 50 GHz. In some embodiments, each laser source provides a laser having a power of at least 10,000 W. In some embodiments, the second collimated annular output beam has an output power of at least 10,000 W. In some embodiments, the second collimated annular output beam has an output power of at least 100 kW. In some embodiments, the second collimated annular output beam has an output power of at least 1 MW. In some embodiments, the second collimated annular output beam has an output power of at least 10 MW. In some embodiments, the method further includes actively positioning one or more optical elements to position the plurality of annular beams such that light from all the annular beams is aligned in the first annular combined collimated beam. In some embodiments, the method further includes astigmatically reshaping the plurality of annular intersecting beams such that a height-to-width ratio of the first annular combined collimated beam is substantially one. In some embodiments, the plurality of laser sources includes a plurality of photonic-crystal-fiber (PCF) amplifiers.

In some embodiments, the method further includes providing a vehicle having an enclosure; supplying electrical power; using the electrical power, controlling and powering the pump sources for the plurality of optical-fiber lasers; and controlling an output direction of the output beam in one of a plurality of different possible directions relative to the vehicle.

In some embodiments, the method further includes providing a vehicle having an enclosure; supplying electrical power from the vehicle; using the electrical power to control and power the plurality of laser sources; providing a Cassegrain projector mounted to the vehicle; receiving the first annular spectrally combined beam into the Cassegrain projector, and forming, with the Cassegrain projector, a collimated second annular output beam from the optical energy of the first annular combined beam; and controlling an output direction of the second annular output beam in one of a plurality of different possible directions relative to the vehicle.

In some embodiments, the present invention provides a system for combining a plurality of laser beamlets to form a single annular beam using spectral beam combination. The system includes means for emitting a plurality of laser beamlets, wherein each one of the plurality of beamlets has a different wavelength; means for annularizing each of the plurality of beamlets to convert each beamlet into a respective annular beam each having an annular cross-sectional power profile; means for pointing each respective one of the plurality of annular beams in a angularly intersecting direction toward a first location; and means for spectral beam combining the intersecting beams at the first location to combine the light of the plurality of wavelengths in the plurality of annular beams into a first annular spectrally combined beam.

In some embodiments, the system further includes means for astigmatically reshaping the plurality of annular intersecting beams such that a height-to-width ratio of the first annular combined collimated beam is substantially one. In some embodiments, the means for astigmatically reshaping the plurality of annular intersecting beams includes an astigmatic lens (a lens where rays that propagate in two perpendicular planes through the lens have different foci) for each of a plurality of the fiber beamlets (e.g., 75 or 76 or 77 of FIG. 2C). In some embodiments, the means for astigmatically reshaping the plurality of annular intersecting beams includes an astigmatic conical element (a conical element having a cross-section in a direction perpendicular to the direction of propagation that is a non-circular oval) for each of a plurality of the fiber beamlets. In some embodiments, the means for astigmatically reshaping the plurality of annular intersecting beams includes an astigmatic grating (a holographic or diffractive beam-shaping element where rays that propagate in two perpendicular planes through the lens have different foci) for each of a plurality of the fiber beamlets.

In some embodiments, the first annular combined beam is a collimated beam. In some such embodiments, the system further includes a Cassegrain projector; and means for receiving the first annular combined collimated beam into the Cassegrain projector, and for forming, with the Cassegrain projector, a second collimated annular output beam from the optical energy of the first annular combined collimated beam.

In some embodiments, the first annular spectrally combined beam is a diverging annular beam. In some such embodiments, the system further includes a Cassegrain projector; and means for receiving the first annular combined diverging beam into the Cassegrain projector, and for forming, with the Cassegrain projector, a second collimated annular output beam from the optical energy of the first annular combined diverging beam.

In some embodiments, the plurality of laser sources includes a plurality of optical-fiber lasers. In some embodiments, the means for emitting a plurality of laser beamlets includes about one-hundred (100) laser fibers arranged in a one-dimensional linear array. In some embodiments, each one of the means for emitting the plurality of laser beamlets has an optical linewidth of about 1 nm. In some embodiments, the second collimated annular output beam has an output power of at least 10,000 W. In some embodiments, the system further includes means for actively positioning one or more optical elements to position the plurality of annular beams such that light from all the annular beams is aligned in the first annular combined collimated beam. In some embodiments, the means for emitting a plurality of laser beamlets includes a plurality of photonic-crystal-fiber (PCF) amplifiers.

In some embodiments, the system further includes a vehicle having an enclosure; means for supplying electrical power from the vehicle; means for controlling and powering the means for emitting the plurality of laser beamlets; a Cassegrain projector mounted to the vehicle; means for receiving the first annular spectrally combined beam into the Cassegrain projector, and for forming, with the Cassegrain projector, a collimated second annular output beam from the optical energy of the first annular combined beam; and means for controlling an output direction of the second annular output beam in one of a plurality of different possible directions relative to the vehicle.

It is to be understood that some or all of the embodiments in the above description (including embodiments described in the patents and patent applications that are incorporated herein by reference) are intended to be combined with and/or to use apparatus, structures and/or methods that are described in one or more other of the embodiments described herein. Unless otherwise explicitly stated, none of the embodiments is to be considered to require all of the elements described for that respective embodiment. It is to be further understood that at least some of the embodiments in the above description (or subsets thereof) are intended to be combined with or to use apparatus, structures and/or methods that are described in the patents and patent applications listed herein, each of which is incorporated herein by reference for all purposes.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A system for combining a plurality of laser beamlets to form a single annular beam using spectral beam combination, the system comprising:
    a plurality of laser sources that emit a plurality of beamlets, wherein each one of the plurality of beamlets has a different wavelength;
    a beam annularizer that includes a plurality of optical units arranged to receive the beamlets, and configured to convert each beamlet into a respective annular beam that has an annular cross-sectional power profile;
    a beam-intersection transform element configured to point each respective one of the plurality of annular beams in an angular intersection arrangement toward a first location; and
    a spectral beam combiner at the first location configured to combine the plurality of wavelengths in the plurality of annular beams into a first annular spectrally combined beam.

2. The system of claim 1, wherein the first annular combined beam is a collimated beam.

3. The system of claim 2, further comprising:
    a Cassegrain projector operatively coupled to receive the first annular spectrally combined collimated beam and configured to form a second collimated annular output beam from the optical energy of the first annular combined collimated beam.

4. The system of claim 1, wherein the first annular spectrally combined beam is a diverging annular beam.

5. The system of claim 4, further comprising:
a Cassegrain projector operatively coupled to receive the first annular combined diverging beam and configured to form a second collimated annular output beam from the optical energy of the first annular combined diverging beam.

6. The system of claim 1, wherein the plurality of laser sources includes a plurality of optical-fiber lasers.

7. The system of claim 1, further comprising:
a mobile vehicle;
an electrical power supply mounted to the vehicle;
a laser controller mounted to the vehicle and operatively coupled to receive electrical power from the electrical power supply and operably coupled to power and control the plurality of laser sources;
a Cassegrain projector mounted to the vehicle and operatively coupled to receive the first annular spectrally combined beam and configured to form a collimated second annular output beam from the optical energy of the first annular spectrally combined beam; and
a beam-direction controller operably coupled to the Cassegrain projector and operable to direct the second annular output beam in one of a plurality of different possible directions relative to the vehicle.

8. The system of claim 1, wherein the first annular combined beam is a collimated beam, the system further comprising:
a Cassegrain projector operatively coupled to receive the first annular spectrally combined collimated beam and configured to form a second collimated annular output beam from the optical energy of the first annular combined collimated beam, wherein the second collimated annular output beam has a larger-diameter than the first annular spectrally combined collimated beam.

9. The system of claim 1, further comprising:
one or more optical elements; and
an active positioning control subsystem operably connected to the one or more of the optical elements to position the beams such that light from all the beams is aligned in the output beam.

10. A method for combining a plurality of laser beamlets to form a single annular beam using spectral beam combination, the method comprising:
emitting a plurality of laser beamlets from a plurality of laser sources, wherein each one of the plurality of beamlets has a different wavelength;
annularizing each of the plurality of beamlets to convert each beamlet into a respective annular beam each having an annular cross-sectional power profile;
pointing each respective one of the plurality of annular beams in a angularly intersecting direction toward a first location; and
spectral beam combining the intersecting beams at the first location to combine the light of the plurality of wavelengths in the plurality of annular beams into a first annular spectrally combined beam.

11. The method of claim 10, wherein the first annular combined beam is a collimated beam.

12. The method of claim 11, further comprising:
providing a Cassegrain projector; and
receiving the first annular combined collimated beam into the Cassegrain projector, and forming, with the Cassegrain projector, a second collimated annular output beam from the optical energy of the first annular combined collimated beam.

13. The method of claim 10, wherein the first annular spectrally combined beam is a diverging annular beam.

14. The method of claim 10, further comprising:
providing a mobile vehicle having an enclosure;
supplying electrical power from the vehicle;
using the electrical power to control and power the plurality of laser sources;
providing a Cassegrain projector mounted to the vehicle;
receiving the first annular spectrally combined beam into the Cassegrain projector, and forming, with the Cassegrain projector, a collimated second annular output beam from the optical energy of the first annular combined diverging beam; and
controlling an output direction of the second annular output beam in one of a plurality of different possible directions relative to the vehicle.

15. The method of claim 10, further comprising:
astigmatically reshaping the plurality of annular intersecting beams such that a height-to-width ratio of the first annular combined collimated beam is substantially one.

16. A method for combining a plurality of laser beamlets to form a single annular beam using spectral beam combination, the method comprising:
emitting a plurality of laser beamlets from a plurality of laser sources, wherein each one of the plurality of beamlets has a different wavelength;
annularizing each of the plurality of beamlets to convert each beamlet into a respective annular beam each having an annular cross-sectional power profile;
pointing each respective one of the plurality of annular beams in a angularly intersecting direction toward a first location;
spectral beam combining the intersecting beams at the first location to combine the light of the plurality of wavelengths in the plurality of annular beams into a first annular spectrally combined beam; and
actively positioning one or more optical elements to position the plurality of annular beams such that light from all the annular beams is aligned in the first annular combined collimated beam.

17. A system for combining a plurality of laser beamlets to form a single annular beam using spectral beam combination, the system comprising:
means for emitting a plurality of laser beamlets, wherein each one of the plurality of beamlets has a different wavelength;
means for annularizing each of the plurality of beamlets to convert each beamlet into a respective annular beam each having an annular cross-sectional power profile;
means for pointing each respective one of the plurality of annular beams in a angularly intersecting direction toward a first location; and
means for spectral beam combining the intersecting beams at the first location to combine the light of the plurality of wavelengths in the plurality of annular beams into a first annular spectrally combined beam.

18. The system of claim 17, further comprising:
means for astigmatically reshaping the plurality of annular intersecting beams such that a height-to-width ratio of the first annular combined collimated beam is substantially one.

19. The system of claim 17, wherein the first annular spectrally combined beam is a collimated beam.

20. The system of claim 19, further comprising:
a Cassegrain projector; and
means for receiving the first annular spectrally combined collimated beam into the Cassegrain projector, and forming, with the Cassegrain projector, a collimated second annular output beam from the optical energy of the first annular combined collimated beam.

21. The system of claim 17, wherein the first annular spectrally combined beam is a diverging annular beam.

22. The system of claim 21, further comprising:
a mobile vehicle having an enclosure;
means for supplying electrical power from the vehicle;
means for controlling and powering the means for emitting the plurality of laser beamlets;
a Cassegrain projector mounted to the vehicle;
means for receiving the first annular spectrally combined beam into the Cassegrain projector, and for forming, with the Cassegrain projector, a collimated second annular output beam from the optical energy of the first annular combined beam; and
means for controlling an output direction of the second annular output beam in one of a plurality of different possible directions relative to the vehicle.

* * * * *